United States Patent [19]
Lloyd

[11] Patent Number: 5,994,681
[45] Date of Patent: Nov. 30, 1999

[54] APPARATUS FOR EDDY CURRENT HEATING A BODY OF GRAPHITE

[75] Inventor: Robert Lloyd, Galston, Australia

[73] Assignee: Larkden Pty. Limited, Sydney, Australia

[21] Appl. No.: 09/018,368

[22] Filed: Feb. 4, 1998

Related U.S. Application Data

[63] Continuation of application No. 08/704,726, filed as application No. PCT/AU95/00139, Mar. 16, 1995, abandoned.

[30]    Foreign Application Priority Data

Mar. 16, 1994  [AU]  Australia .................................. PM4518
Dec. 13, 1994  [AU]  Australia .................................. PN0024

[51] Int. Cl.⁶ ...................................................... H05B 6/10
[52] U.S. Cl. .......................... 219/631; 219/628; 219/634; 219/649
[58] Field of Search .................................. 219/630, 631, 219/628, 670, 672, 634, 618, 649

[56]            References Cited

U.S. PATENT DOCUMENTS

| | | | |
|---|---|---|---|
| 1,465,545 | 8/1923 | Demongeot . | |
| 3,344,294 | 9/1967 | de Castelet | ............................. 310/191 |
| 3,549,847 | 12/1970 | Clark et al. | ........................... 219/10.49 |
| 3,821,508 | 6/1974 | Hagerty | .................................. 219/631 |

(List continued on next page.)

FOREIGN PATENT DOCUMENTS

| | | |
|---|---|---|
| 0040875 | 2/1981 | European Pat. Off. . |
| 0077702 | 4/1983 | European Pat. Off. . |
| 2429392 | 1/1980 | France . |
| 2452846 | 10/1980 | France . |
| 2516641 | 5/1983 | France . |
| 2536943 | 6/1984 | France . |
| 2532465 | 2/1976 | Germany . |
| 3023255 | 1/1982 | Germany . |
| 52-24541 | 2/1977 | Japan . |
| 56-125225 | 10/1981 | Japan . |
| 60-51623 | 3/1985 | Japan . |
| 2155190 | 6/1990 | Japan . |
| 410379 | 1/1992 | Japan . |
| 4265232 | 9/1992 | Japan . |
| 5279062 | 10/1993 | Japan . |
| 976229 | 11/1982 | U.S.S.R. . |
| 224163 | 11/1924 | United Kingdom . |

(List continued on next page.)

OTHER PUBLICATIONS

Abstract of JP 5279062 dated Oct. 26, 1993 (C–1160) p. 71.
Abstract of JP 4265232 dated Sep. 21, 1992 (C–1023) p. 3.
Abstract of JP 6051623 dated Mar. 23, 1985 (C–294) p. 2.
Abstract of FR 2452846 dated Nov. 28, 1980.
Abstract of FR 2536943 dated Jun. 1, 1984.
Abstract of EP 0077702 dated Apr. 27, 1983.
Derwent Abstract of FR 2516641 dated May 5, 1983.
Abstract of JP 2155190 dated Jun. 14, 1990 (E–973) p. 38.
Abstract of JP 410379 dated Jan. 14, 1992 (jE–1191) p. 16.
Abstract of DE 3023255 dated Jan, 7, 1982.
Abstract of SU 976229 dated Nov. 23, 1982.
Derwent Abstract of FR 2429392dated Feb. 22, 1980.
Abstract of DE 2532465 dated Feb. 26, 1976.
Abstract of JP 5224541 dated Feb. 24, 1977(jE–77) p. 2212.

*Primary Examiner*—Philip H. Leung
*Attorney, Agent, or Firm*—Ladas & Parry

[57]            ABSTRACT

A method and apparatus has a body of graphite and a magnetic field source operatively connected with the body of graphite so that a magnetic field of the magnetic field source penetrates at least a portion of a surface of the body of graphite. The portion of the surface is crystalline graphite. At least one of the magnetic field source and the body of graphite is movable relative to the other for movement of the at least one of the magnetic field source and the body of graphite relative to the other to cause the magnetic field in the surface portion of the body of graphite to vary to induce eddy currents in the body of graphite and heat the body of graphite.

16 Claims, 12 Drawing Sheets

U.S. PATENT DOCUMENTS

| | | | |
|---|---|---|---|
| 3,942,026 | 3/1976 | Carter | 290/55 |
| 4,089,176 | 5/1978 | Ashe | 219/628 |
| 4,139,677 | 2/1979 | Blair et al. | 428/409 |
| 4,238,337 | 12/1980 | Peters et al. | 219/628 |
| 4,291,235 | 9/1981 | Bergey, Jr. et al. | 290/55 |
| 4,292,532 | 9/1981 | Leroux | 290/6 |
| 4,299,205 | 11/1981 | Garfield | 126/449 |
| 4,358,306 | 11/1982 | Okamoto et al. | 65/32 |
| 4,421,967 | 12/1983 | Birgel et al. | 219/631 |
| 4,486,638 | 12/1984 | DeBennetot | 219/631 |
| 4,511,777 | 4/1985 | Gerard | 219/631 |
| 4,600,821 | 7/1986 | Fichtner et al. | 219/631 |
| 4,678,881 | 7/1987 | Griffith | 219/631 |

FOREIGN PATENT DOCUMENTS

| | | |
|---|---|---|
| 1541221 | 2/1979 | United Kingdom . |
| 2051496 | 1/1981 | United Kingdom . |
| 2088536 | 6/1982 | United Kingdom . |
| 2149071 | 6/1985 | United Kingdom . |
| 2207739 | 2/1989 | United Kingdom . |
| 2247141 | 2/1992 | United Kingdom . |
| 2266197 | 10/1993 | United Kingdom . |

APPARATUS FOR EDDY CURRENT HEATING A BODY OF GRAPHITE

This is a continuation of application Ser. No. 08/704,726 filed on Nov. 5, 1996 now abandoned which is PCT/AU95/00139 filed Mar. 16, 1995, claims the benefit thereof and incorporates the same by reference.

TECHNICAL FIELD

The invention relates to a method and apparatus for collecting and/or storing heat energy in a directly usable form. The invention also relates to a method for converting heat energy into useful work and to an apparatus for use in such a method. The invention further relates to an apparatus for generating electricity from a moving fluid. The invention still further relates to a process for producing a lens. The invention even further relates to an apparatus and a method for heating a body of material capable of being heated by induced eddy currents.

BACKGROUND ART

There is a need for methods for the use, storage or recovery of forms of energy which at present are under-utilised, or utilised inefficiently. Examples of such forms of energy are waste heat from industrial processes, heat from waste incineration, and solar energy in various forms, such as insolation, tidal energy, wind energy, ocean currents and hydrodynamic energy. Insolation energy conversion in particular is the subject of intensive research. Present methods of collection of solar energy mainly depend either on using the solar collector to heat water and generate steam which is then converted to rotary motive power, or on using solar radiation to produce electrical energy in solar cells. Other forms of waste heat energy are often utilised by heating water and generating steam. In such processes, major losses in the energy collection and conversion to steam are inherent. In addition, the energy collected and converted cannot be economically stored. Such a disadvantage is particularly acute in the collection of solar energy, because of the variability and unpredictability of the incidence of solar radiation.

The direct conversion of solar energy to electricity is at present only possible with relatively low efficiencies. Current methods of storing solar energy converted into electrical power are by use of electrical storage batteries but in most cases, known batteries are too expensive and inefficient to justify their widespread use.

A further shortcoming of present energy supply technologies results from the need for large scale commercial producers of electricity to install generating capacity substantially in excess of the average demand, because electricity generating plant must meet peaks of demand, which typically occur in the mornings and evenings and which are usually highest in winter, and because there previously existed no convenient and inexpensive method for storing electrical energy on a large scale.

Thus, there is a need for a method which provides for efficient conversion and/or storage of energy, particularly waste or low grade heat energy.

The unusual properties of graphite render it of surprising utility in the collection and storage of energy. The useful properties of graphite in this connection include: (a) its high thermal conductivity, (b) its high heat capacity, especially at elevated temperatures and (c) heat lost by radiation is relatively low when graphite is hot (except for long wavelength radiation).

Further, known methods for the utilisation of solar energy in its various forms are subject to inefficiencies, particularly, in the case of windmills or water turbines, at low air or water flow rates (such as in low winds, in the case of windmills.) Thus there is a need for an improved apparatus for generating electricity from a moving fluid, and for a an improved apparatus for more efficiently converting solar energy in the form of wind or water power into more directly usable heat energy.

Additionally, known methods for the collection of solar radiation using lenses or mirrors tend to be cumbersome and expensive owing to the need for sophisticated tracking equipment to permit the lens or mirror to be positioned at all times of the day and in all seasons so as to collect the sun's rays. There is therefore a need for an improved process for producing a lens which can simplify the collection of solar radiation.

OBJECTS OF THE INVENTION

It is an object of the invention to provide an apparatus for the collection and/or storage of heat energy. It is a further object of the invention to provide a method for the collection and/or storage of heat energy. It is a still further object of the invention to provide an apparatus for generating electricity from a moving fluid. It is yet a further object of the invention provide an apparatus and a method for heating a body of material capable of being heated by induced eddy currents.

SUMMARY OF THE INVENTION

According to a first embodiment of the invention there is provided an apparatus for the collection and storage of heat energy, comprising:

(a) a first body of graphite for the storage of heat energy,
(b) means for heating the first body of graphite operatively associated with the first body of graphite to heat it,
(c) means for utilising the heat energy stored in the first body of graphite operatively associated with the first body of graphite.

The heat energy may be utilised directly, or after conversion to another form of energy. Usually, the apparatus of the invention further comprise means to convert the heat stored in the first body of graphite to usable power. Alternatively, the heat stored in the first body of graphite may, for example, be used directly for space heating or cooking.

Generally, the means for utilising the heat energy stored in the first body of graphite comprises (d) means to heat a fluid, operatively associated with means to extract usable power from the heated fluid.

Usually, the means to heat a fluid comprises (e) one or more further bodies of graphite for receiving heat from the first body of graphite, (f) means operatively associated with the bodies of graphite for transferring heat from the first body of graphite to the further bodies of graphite, and (g) means for contacting the fluid with the further body or bodies of graphite, thereby heating the fluid. This form of the invention is usually used where the temperature of the first body of graphite is too great for its efficient or practical use directly to heat a fluid for the purpose of extracting usable power therefrom, and enables a suitable working temperature to be attained for utilising the heat stored. Where temperature considerations do not necessitate the use of further bodies of graphite, the fluid to be heated may be contacted with the first body of graphite so as to heat the fluid.

The means for heating operatively associated with the first body of graphite may comprise means for directing solar energy onto the first body of graphite, for example using a mirror or lens to direct and focus light from the sun onto the surface of the first body of graphite. Typically, means for directing solar energy onto the first mass of graphite may comprise a lens. Usually, the lens is an elongated lens of the type described below. Alternatively, mirror or system of mirrors or other reflective surfaces may be used. Where the apparatus of the invention is used as a solar energy collector, the solar energy may be directed onto one or more exposed surfaces of the first body of graphite. In that case, the first body of graphite typically comprises an elongated projection onto which solar energy is directed.

Alternatively, the means for heating operatively associated with the first body of graphite may be electrical. Electrical heating may be resistive or inductive. Typically, electrical means for heating the first body of graphite comprises an induction coil disposed to heat he first body of graphite when alternating current passes through the induction coil. Usually, the alternating current is applied from a mains electricity supply, for example using off-peak electricity, or is generated indirectly from solar energy, for example from the wind or from the motion of water in streams or rivers or in the tides or ocean currents.

In another form of the present invention there is provided an apparatus for heating a body of material capable of being heated by induced eddy currents, comprising a magnetic field source, the magnetic field source being operatively associated with the body of the material capable of being heated by induced eddy currents so that the magnetic field of the magnetic field source penetrates at least a portion of the surface of the body of material, at least one of the magnetic field source and the body of material being movable relative to the other wherein movement of the magnetic field source relative to the body of material causes the magnetic field in said surface portion of the body of material to vary, thereby inducing eddy currents in the body of material and heating it.

In this form of the invention the apparatus typically further comprises means to move the magnetic field source, or the body of material capable of being heated by induced eddy currents, or both. Generally, the apparatus of this form of the invention further comprises heat insulation means operatively associated with the body of material capable of being heated by induced eddy currents to reduce heat losses therefrom.

There is also provided a method for heating a body of material capable of being heated by induced eddy currents, comprising providing a body of material capable of being heated by induced eddy currents and a magnetic field source, at least one of the magnetic field source and the body of material being movable relative to one another, positioning the magnetic field source so that its magnetic field penetrates at least a portion of the surface of the body of said material, and moving at least one of the magnetic field source and the body of said material relative to the other sufficiently to induce eddy currents in the body of said material and thereby heat the body of said material.

Typically, in the apparatus and method of this form of the invention, the magnetic field source is movable relative to the body of material capable of being heated by induced eddy currents, the body of material being fixed. More typically, the means to move the magnetic field source comprises a windmill or a turbine driven by flowing water operatively associated with the magnetic field source to move it.

Typically the magnetic field source includes an assembly of a plurality of permanent magnets or electromagnets which are positioned adjacent a region of the surface of the body of the material capable of being heated by induced eddy currents, the assembly being rotated relative to the body of the material. More typically, the assembly of magnets is in the form of a circular plate, as described in more detail below. Generally, the assembly of magnets is rotated by means of a windmill or water-driven turbine. The material capable of being heated by induced eddy currents may be any electrically conductive, non-magnetic material. Generally, the material is graphite. Typically, the body of the material capable of being heated by induced eddy currents is the first body of graphite in an apparatus of the first embodiment of the invention.

As a still further alternative, the means for heating operatively associated with the first body of graphite may comprise means for contacting the first body of graphite with hot air or other gases containing waste or low grade heat.

As yet a further alternative, the first body of graphite may be heated by the combustion of a fuel, for example coal or natural gas. In one form of this embodiment, the first body of graphite may be arranged in thermal communication with a ceramic furnace adapted for the combustion of coal admitted to the furnace. In this way, heat generated by the combustion may be stored in the body of graphite for later use, or may be converted efficiently into rotary motive power.

In a further form of the apparatus of the first embodiment, the means for heating comprises at least two means selected from the group consisting of means for directing solar energy onto the first body of graphite, electrical heating means, eddy current heating means, and means for combusting a fuel.

According to a second embodiment of the invention there is provided a method for the collection, storage and utilisation of heat energy, comprising:

(a) heating a first body of graphite for the collection of heat energy, (b) storing the heat energy in the first body of graphite, and (c) utilising the stored heat from the first body of graphite.

The heat energy may be utilised directly as heat, or after conversion to another form of energy. Typically, the method of the second embodiment may comprise the step of utilising the heat stored in the first body of graphite as power. More typically, the step of using the heat stored in the first body of graphite as power comprises the steps of heating a fluid, and extracting usable power from the fluid.

The step of heating the fluid may comprise the steps of transferring heat from the first body of graphite to one or more further bodies of graphite and contacting the fluid with the one or more further bodies of graphite, thereby heating the fluid. Alternatively, the fluid to be heated may be contacted directly with the first body of graphite.

Typically, in the apparatus of the first embodiment and the method of the second embodiment, the usable power is motive power, more typically rotary motive power.

Usually, in the apparatus of the first embodiment and the method of the second embodiment, the heated fluid is a gas, typically air. However, other gases such as nitrogen, argon, helium, carbon dioxide, steam or mixtures thereof may be used. For the purpose of heating a fluid medium, a graphite body which is to be used as the heat store may comprise a system of inter-connected hollowed chambers or tubes through which the fluid medium can flow.

The graphite used in the method and apparatus of the invention may be synthetic or impure graphite or high natural graphite. The graphite may contain mineral impurities. The use of high purity natural graphite is preferred, for example graphite having a purity of from 95 weight % to 99.9 weight %, as higher storage heat levels are possible when it is used, but graphite having a purity of 90–99 weight %, more typically from about 93 weight % to about 98 weight %, still more typically about 95 weight %, may be used with excellent results. The graphite bodies may be blocks of solid graphite or compressed granular graphite. The graphite bodies may be fabricated from a single block of graphite, or they may comprise two or more smaller blocks which are adapted to make efficient thermal contact with adjacent blocks when brought into contact with them. In this embodiment, the smaller blocks may suitably be held in contact by passing graphite fibres around or through the blocks and tensioning the graphite fibres. Alternatively, crude graphite occurs naturally and is mined commercially. Blocks of crude natural graphite as mined, typically about 90 weight % graphite, may, for example, be heated in vacuo to about 2200–2500° C., more typically about 2400° C. until essentially no further volatiles are evolved, which typically provides graphite of at least about 95 weight % purity which may be used in the method and apparatus of the invention. As a further alternatives, a body of graphite may be manufactured in situ by forming a body of a suitable carbonaceous material and heating the carbonaceous material under reduced pressure to graphitise the carbonaceous material. Suitable carbonaceous materials for this purpose include those materials of a relatively high carbon content which are solid or semi-solid. Examples are amorphous carbon, tar, bitumen, pitch, asphalt, coal, anthracite and sucrose. The body of carbonaceous material may be reinforced with carbon fibres or with carbon cloth. Thus, a typical method for preparing a block of graphite for use as part of a graphite body comprises the steps of (i) preparing a mixture of pitch, graphite cloth and graphite powder, (ii) softening the mixture by heating it, (iii) charging the softened mixture into a mould of the desired size and shape, (iv) positioning the charged mould in a heatable evacuatable enclosure, (v) evacuating the enclosure to a pressure of 50 kPa or less, typically 10–50 kPa. (vi) heating the mould gradually to a temperature of approximately 2200–2500° C., more typically approximately 2400° C. for 24–48 hours while maintaining the pressure at 50 kPa or less, typically 10–50 kPa, to graphitise the pitch, (vii) cooling the mould, (viii) admitting air to the enclosure and (ix) removing the graphitised block from the mould.

The heat transfer between the bodies of graphite, where applicable, may be by one or more rods of conductive metal or graphite in contact with, or inserted or embedded in the bodies of graphite, or by one or more blocks of conductive metal or graphite which are locatable in contact simultaneously with the bodies of graphite between which heat is to be transferred, or by the use of a conveyor system for the transfer of loose granular conductive particles, or by any combination of these methods. Suitable conductive metals include high temperature steel, aluminium, copper and silver. Granular conductive particles may be particles of a conductive metal or of graphite. Usually, the conductive particles are graphite. A suitable conveyor system for the transfer of loose granular conductive particles is the "Floveyer" system manufactured by G.P.M. (Australia) Pty. Ltd. of North Strathfield, New South Wales. When used in the apparatus of the first embodiment, the conveyor carries graphite particles in a circuit passing from one body of graphite into a another body of graphite and thereafter returning to the first-mentioned body of graphite. The transfer system of the Floveyer is drawn by a cable, at intervals along the length of which are projections or discs, arranged substantially perpendicularly to the direction of motion of the cable. The cable is moved by motor-driven pulleys.

The differential temperature between any two graphite bodies between which heat is transferred may be controlled by the number, size or material of the interconnecting heat transfer means. Alternatively, where a "Floveyer" or similar heat transfer means is utilised, the differential temperatures may be controlled by the circulation rate of the conductive particles. Alternatively, the temperature of a body of graphite from which heat is extracted may be controlled by intermittently connecting and disconnecting the heat transfer means between that body of graphite and the graphite body which is used as the source of heat. For example, the heat transfer means may comprise a graphite block which may be brought into contact with both graphite bodies simultaneously. In this position, the hotter graphite body heats the cooler one. When the cooler body reaches its desired temperature, the heat transfer block may be separated from one or both of the graphite bodies whereupon if steps are taken to minimise convectional and radiant losses, little or no heat flows from one to the other. As heat is removed from the cooler body and its temperature falls below a desired level, the heat transfer block may be brought back into contact with the graphite bodies once again. One way of achieving the connection and disconnection of the heat transfer block is by disposing it in cooperation with a bimetallic strip selected to deform sufficiently, at the desired set temperature of the cooler graphite body, to separate the heat transfer block from the graphite body or bodies.

Typically, the graphite bodies and heat transfer means of the apparatus and method of the invention are thermally insulated from their surroundings. Thermal insulation is typically mineral fibre or ceramic. More typically, the system of graphite blocks and heat transfer means is surrounded by a jacket or housing, which is evacuated internally to minimise convectional heat loss. The inner surfaces of the jacket or housing are usually highly polished to minimise radiative heat loss. Usually, the jacket or housing is a metal jacket. More usually, the jacket or housing is steel. When the jacket or housing is evacuated internally, the graphite body or bodies is/are separated from the jacket or housing by one or more insulating spacers. The insulating spacers may be a single thickness of ceramic, or two or more layers of the same or different ceramics, optionally separated by a layer of a metal, such as steel or aluminium. Examples of suitable ceramic thermal insulators include metal oxides such as beryllium oxide, magnesium oxide, calcium oxide, strontium oxide, osmium oxide, lanthanum trioxide, yttrium trioxide, scandium trioxide, titanium dioxide, zirconium dioxide, hafnium dioxide, tantalum pentoxide, niobium pentoxide, alumina, silica, nickel oxide, and other inorganic materials such as silicon nitride, silicon carbide, boron carbide, tantalum carbide, titanium carbide, tungsten carbide, zirconium carbide, aluminium nitride, zirconium boride, spinel, mullite, corundum, forsterite, fireclay, dolomite, zircon, magnesite, high-alumina porcelains, high-magnesia porcelains, sillimanite, kyanite, zirconium silicate and mixtures thereof.

More typically, the insulating spacers comprise one or more layers of graphite-impregnated ceramic in thermal contact with a heat exchanger which separates the impregnated ceramic from the jacket or housing, as described in more detail below. In this arrangement, the heat exchanger can be maintained at a low enough temperature to minimise heat loss from the graphite body or bodies to the jacket or housing while, with suitable choice of graphite-impregnated ceramics, the body or body of graphite may be maintained at a very high temperature. Typically, the body or bodies of graphite within the jacket or housing is/are maintained at a temperature of up to 2800° C. More typically, the body or bodies of graphite is/are maintained at a temperature of from about 1400° C. to about 2000 C., even more typically at a temperature of about 1800° C.

The housing may be evacuated internally and then sealed so as to retain the internal vacuum, or it may be connected to a vacuum pump for maintaining the vacuum. Typically, where a vacuum pump is connected, the pump is arranged so as to operate only intermittently, for example when leaks cause the pressure in the housing to rise above a predetermined value. The vacuum in the housing is typically maintained in the range of from about 1 Pa to about 10 kPa, more typically on the range of from about 5 Pa to about 1 kPa, still more typically in the range of from about 10 Pa to about 200 Pa.

It will be appreciated that direct contact between any of the bodies of graphite and hot air or other oxidising gases is to be avoided when the temperature of those gases is such as to result in substantial oxidation of the body or bodies of graphite. The temperature at which such oxidation occurs depends on the purity of the graphite, but may be as low as 600° C. for impure graphitized carbon up to 930° C. for pure natural graphite.

Where the temperature of one or more graphite bodies exceeds the temperature at which oxidation occurs, an evacuated jacket as described above is usually employed. Alternatively, the graphite bodies and/or heat transfer means may be coated with a material such as ziron or osmium oxide to prevent oxidation.

The apparatus of the first embodiment and the method of the second embodiment utilise the high thermal conductivity of graphite and its unusually high specific heat at high temperatures to provide a system for collection and storage of energy. The specific heat of any material is a function of the temperature of the material. The total heat energy H which is required to raise a body from an initial temperature $T_1$ to a final temperature $T_2$ may be expressed as $$H = \int_{T_1}^{T_2} c(t) dt$$

where c(t) is the specific heat of the body at temperature t.

When $T_2$ is higher than the ambient temperature of the surroundings of the body, the quantity of heat H or some part of it is available to do useful work. The relationship between the temperature of a mass of graphite and the amount of energy absorbed by the mass of graphite is depicted in FIG. 1, from which it will be seen that at temperatures above approximately 600° C. the absorption of additional energy by the hot mass results in relatively little further warming, particularly in comparison to a material such as iron. Thus, a relatively high heat storage capability is exhibited by graphite. At a temperature of about 1600° C., for example, a 1 tonne mass of graphite stores approximately 3.6 GJ of energy more than it stores at 20° C. By comparison, by the same mass of iron at the same temperature stores approximately 1.3 GJ.

Furthermore, the high thermal conductivity of graphite ensures that local overheating of a mass of graphite is minimised. When energy is applied to a small region of a graphite block the whole of the block is thereby heated essentially uniformly. The thermal conductivity of graphite may also be exploited in the heat transfer means in the embodiments of the invention, by constructing the heat transfer means from graphite, or by otherwise utilising graphite in the heat transfer means as described above.

Where the first graphite body is heated electrically, this may conveniently be achieved by arranging an induction coil surrounding some part of the graphite body and passing an alternating current through the coil. Induced currents in the graphite body then result in the graphite body being heated. Typically, the frequency of the alternating current is in the range of from 50 Hz to 100 MHz, more typically from 50 Hz to 100 kHz, still more typically from 100 Hz to 10 kHz, even more typically about 960 Hz.

The source of electricity may be any convenient source, such as mains electricity, particularly where supply at lower-priced rates is available at times of low electricity demand. The energy stored in the graphite bodies of the apparatus of the invention may then be used at times of peak electricity demand, resulting in cheaper overall electricity costs. A similar strategy can be used by electricity suppliers in order to smooth the load demand on the electricity generators.

Alternatively, in many locations, and particularly in remote locations, it may be convenient for electrical energy used to heat the first graphite body to be generated by a means associated with a moving fluid, such as flowing water in a stream or river, or ocean tides or currents, or wind. Designs for the generation of electricity from such sources of energy have hitherto suffered from the disadvantages (i) that the rotation speed of the turbine varies with the speed of movement of the fluid and (ii) when fluids moving at low speeds impinge on known turbines insufficient torque is typically generated to overcome inertia in the generator, line resistances and the like. In addition, maintenance costs are high and storage systems for the captured energy (typically batteries) are bulky, expensive and inefficient. Inductive heating, by contrast, requires fewer moving parts, and operates by passing a high current at low voltages, which permits much more efficient use of the energy captured by a turbine. Further, as discussed above, storage of the captured energy in bodies of graphite overcomes many of the disadvantages of battery-based electricity storage.

Preferably, for maximum efficiency, a turbine for use in an apparatus for generating electricity from a moving fluid such as wind, water, ocean tides or ocean currents should operate at an approximately constant rotation speed which is selected to maximise the efficiency of the electricity generator. In particular, such a turbine should be capable of operating effectively at low fluid speeds, for example down to fluid speeds of about 1 m/s or down to fluid speeds of about 0.5 m/s. Hitherto, such turbines have not been known.

According to a third embodiment of the present invention there is provided an apparatus for generating electricity from a moving fluid which comprises:

a turbine adapted to rotate when the moving fluid impinges on the turbine;

means to generate electricity comprising stator magnets having opposable poles positionable so as to define an air gap therebetween and a rotor having electrical windings connectable to an electrical load, the rotor being positionable in the air gap and operatively associated with the turbine to be rotatable thereby; and means operatively associated with the turbine to adjust the air gap, whereby the rotation speed of the rotor is maintainable at a desired value.

More specifically, according to the third embodiment there is provided an apparatus for generating electricity from a moving fluid comprising:

a turbine adapted to rotate when the moving fluid impinges on the turbine;

means to generate electricity comprising at least one pair of stator magnets and a rotor positioned in an air gap and operatively associated with the turbine to be rotatable thereby, wherein the rotor has electrical windings connectable to an electrical load and wherein the air gap is defined by the opposite poles of the magnets of the pairs positioned on opposite sides of the air gap; and means operatively associated with the turbine and the stator magnets to move the magnets and thereby change the air gap, whereby the rotation speed of the rotor is substantially maintainable at a desired value when the rotation speed of said turbine exceeds a predetermined value.

The apparatus of the third embodiment may be adapted to generate d.c. or a.c. Where the apparatus is adapted to generate a.c., it will be appreciated that since the rotation speed of the rotor is maintained at a desired value, the frequency of the a.c. will be substantially constant. Since the rotor is driven by the turbine, a braking action on the rotor which results from a narrowing of the air gap between the magnets and the rotor results in a braking action on the turbine also. Typically, the apparatus of the third embodiment is adapted so that the rotation speed of the turbine is maintainable at about 10–200 revolutions per minute, more typically about 30–100 revolutions per minute, even more typically about 40–70 revolutions per minute, still more typically about 50 revolutions per minute. When the turbine is operated as a windmill, for example, it typically maintains a rotation speed of about 50 revolutions per minute at a wind speed of as low as 0.5 m/sec.

The apparatus of the third embodiment may further comprise means to convert d.c. to a.c. Suitably, the means to convert d.c. to a.c. may be adapted to convert d.c. to any selected a.c. frequency, for example up to 250 kHz, or up to 100 kHz or up to 50 kHz. More typically, the means to convert d.c. to a.c. is adapted to convert d.c. to a.c. of up to 5000 Hz, most typically of up to 1000 Hz. The means to convert d.c. to a.c. may be electronic or mechanical. Electronic methods may utilise circuitry well known in the art for the purpose. An example of a suitable mechanical apparatus for converting d.c. to a.c. comprises means whereby d.c. generated by the apparatus of the third embodiment is connected alternately to one of two poles of an a.c. supply, the means being adapted to operate when the turbine rotates. Where the turbine rotation speed is relatively slow, the apparatus for converting d.c. to a.c. can comprise means for increasing the a.c. frequency. Suitably, such an apparatus comprises: a disc or ring comprising a plurality of radially spaced undulations and adapted to rotate when the turbine rotates; a plunger comprising a fixed portion and a movable portion having a contact region, the contact region comprising positive and negative d.c. contacts connectable to the electrical windings of the rotor; and a first and second pair of a.c. terminals of reverse polarity connected in parallel; wherein the movable portion of the plunger is adapted to be maintainable in sliding contact with the undulations of the disc or ring and wherein movement of the moveable portion in contact with the undulations causes the positive and negative terminals to be alternately in contact with the first pair of a.c. terminals and the second pair of a.c. terminals.

More particularly, the apparatus to convert d.c. to a.c. comprises:

a disc or ring having a rotation axis and comprising a plurality of radially spaced undulations disposed substantially in a circle around the rotation axis, the disk or ring being operatively associated with the turbine to rotate about the rotation axis when the turbine rotates; and a plunger comprising an electrical contact region and a slider region, the electrical contact region comprising (i) positive and negative d.c. contacts connectable to the electrical windings of the rotor, and (ii) a first and second pair of a.c. terminals of opposite polarity connectable in parallel to an electrical load;

wherein the slider region is adapted to be maintainable in sliding contact with the undulations of the disc or ring and wherein the positive and negative d.c. contacts are in contact with the first pair of a.c. terminals at one extreme of movement of the plunger in contact with the undulations and the positive and negative d.c. contacts are in contact with the second pair of a.c. terminals at the other extreme of movement of the plunger in contact with the undulations.

Alternating current generated by the apparatus of the third embodiment may be utilised for induction heating of a body of graphite in an apparatus of the first embodiment. Alternatively, as previously noted, mains electricity of 50 or 60Hz frequency may be utilised for induction heating of a body of graphite in an apparatus of the first embodiment. Where high frequency induction heating is used, for example at a frequency in the range from about 100 Hz to about 100MHz as described above, this may be achieved by methods generally known in the art. For example a spiral arrangement of copper tubes may be passed around or through a part of the graphite body, and the high frequency alternating current passed through these copper tubes. Where insufficient cooling is provided by the graphite body to prevent damage to or melting of the copper tubes, cooling water may be passed through them. Typically, this method of heating requires the use of cooling water in the copper tubes, and the heat carried away by the water reduces the overall efficiency of the induction heating system. In an alternative system of induction heating, graphite fibres or graphite tape may be passed around or through a part of a graphite body in the apparatus of the first embodiment and separated from the graphite body by electrical insulation. The passage of alternating current through the graphite fibres or graphite tape then causes inductive heating of the graphite body. Because of the high melting temperature of graphite, this method of heating has the advantage that no coolant is required and consequently the heating of the graphite body is more efficient. Where the thickness of the graphite body is sufficient, for example greater than about 150 mm, efficient induction heating may be achieved using mains electricity or other electricity supply at a frequency in the range of about 50–20000 Hz, more typically in the range of about 50–5000 Hz, even typically in the range of about 50–1000 Hz, still more typically in the range of about 50–100 Hz.

In the form of the invention in which the first body of graphite is heated by eddy currents induced by moving a magnetic field source relative to the first body of graphite, essentially any movement of a magnetic field which penetrates a part of the first body of graphite will induce electrical currents in the graphite, owing to its electrical conductivity. The induced electrical currents flowing in the graphite produce a temperature rise in the graphite. Thus heating may be caused, for example, by sweeping a magnetic field along one dimension of the graphite body and back again, or by increasing and decreasing the distance between a magnet and a surface of the graphite body. More typically, however, the movement of the magnetic field source relative to the graphite body is rotational. Generally, the graphite body is fixed in position and is subjected to a varying magnetic field which rotates relative to the graphite body. Thus in this arrangement the magnetic field source typically comprises a number of magnets such that when the magnetic field source is rotated the magnetic field at any fixed point immediately adjacent the magnetic field source changes direction from 2 to 200, more typically from 10 to 100, even more typically from 25 to 75, still more typically about 50 times in each revolution. This may be achieved by arranging magnets in an essentially circular array which can be positioned in proximity to the graphite body and rotated relative to it. For example the array of magnets may be disposed around the graphite body (for instance where the graphite body or a portion of it has a cylindrical shape) and caused to rotate around the graphite body. Alternatively the magnets may be positioned proximate the circumference of a circular disk having a rotatable shaft substantially at its centre, the flat surface of the disk being opposable to an essentially flat portion of the surface of the graphite body such that when the shaft of the disk is rotated the magnets move relative to the surface of the graphite body. In this arrangement, the magnets my be bar-shaped, with one end-pole positioned at or near the surface of the disk which is opposed to the graphite body and the other end-pole remote from that surface. More typically, the magnets have the shape of an inverted "U" and are arranged so that both their poles are positioned at or near the surface of the disk which is opposed to the graphite body.

Generally where more than one magnet is included in the magnetic field source the magnets are positioned approximately equidistant from adjacent magnets, for example at approximately equal distances around the circumference of a circle, although this is not essential. The magnets may be permanent magnets or electromagnets. It will be appreciated that where permanent magnets are used, it is essential that they remain below their Curie temperature and it may be necessary to cover the side of the magnet which faces the graphite body with a thickness of a substantially non-electrically conductive thermal insulation sufficient to maintain the temperature of the magnets below their Curie temperature, typically about 110° C. Where electromagnets are used, the temperature of the core material is typically maintained at below about 250° C. Typically, ceramic insulation may be used, which can shield the magnets from short and long wavelength radiation, and in particular relatively long wavelength radiation, emitted from the graphite body. In this context, the term "short wavelength" refers to those wavelengths which tend to be naturally retained, rather than radiated, by graphite. The term "long wavelength" refers to those wavelengths which tend to be radiated by graphite. Such wavelengths may be readily determined by persons skilled in the relevant art.

Examples of suitable ceramic thermal insulators which may be used to shield the magnets include those exemplified herein above. Generally, the thermal insulation is "Kaowool TBM2830" thermally bonded material available in Australia from Morgan Thermal Ceramics through Heat Containment Industries Pty Ltd of Alexandria, New South Wales. Crystalline graphite may be incorporated into the thermal insulation to limit the effect of short wave radiation. Especially where the array of magnets and the graphite body are housed in an evacuated housing, this arrangement can effectively maintain the magnets at below their Curie temperature and so avoid loss of magnetic field.

Suitable materials for fabrication of the permanent magnets include any known permanently magnetic materials. Examples of such materials include iron, nickel, cobalt, steels and other alloys of iron, nickel or cobalt such as Alnicos, Cunico, Cunife, Hycols, iron/aluminium, iron/aluminium/silicon, iron/nickel, iron/aluminium/nickel, iron/cobalt, iron/silicon or platinum/cobalt, Vicalloys, Alcomaxes, Permalloys, Monimax, Sinimax, Nu-metal, Supermalloys, Permendurs, Remalloys, manganese/aluminium/carbon alloys, rare earth metal magnets, ferrites (for example of barium, strontium, lead, yttrium or other rare earth elements) garnets such as yttrium iron garnet, or ferric oxide. Typically, the permanently magnetic material is a niobium/iron alloy or a rare earth alloy with iron, nickel and/or cobalt, more typically an alloy of iron with niobium or of samarium with cobalt.

Where electromagnets are used, thermal insulation of the magnets is less important as the magnets may be operated at much higher temperatures, typically up to about 250° C., that permanent magnets. The current source for the electromagnets may be any convenient source such as a battery, d.c. or a.c. generator or mains supply. Conveniently, the current source for the electromagnets may be a generator driven by the same shaft that causes rotation of the array of magnets.

The number of magnets in the array is selected so as to produce a minimum rate of change in the magnetic field experienced by the graphite body of about 50 Hz at the slowest practicable rate of rotation of the array of magnets. Typically where the magnets are arranged in a circular array they are arranged with alternating polarity. That is, the magnetic pole facing the graphite body in any magnet is opposite to that of each of the magnets next to it in either direction around the circle so that the magnetic poles facing the graphite body alternate north, south, north, south, . . . , around the circle. Where magnets having an inverted "U" shape used, they are generally arranged in a circle near the periphery of the circular array, with the north and south poles of each magnet typically being positioned axially or radially with respect to each other.

The array of magnets may be caused to rotate by any convenient energy source. Typically the energy source may be a windmill, water turbine drive, for example, by a flowing river or stream or by wave, tidal or ocean current movement, waste energy of various kinds, or electricity genrated at times of low demand to be stored as heat energy for recovery as electricity later at times of higher demand. Where a windmill or water turbine is used, the rotation of the array of magnets may be driven directly by the windmill or turbine, or an arrangement of gears may be provided. Typically, gears are not required. If a windmill is used to drive the rotation of the array of magnets, the windmill is typically horizontal and is connected to the array of magnets by a straight shaft. Generally, the windmill has blades of a fixed pitch, although variable pitch blades may also be used.

Typically, the space between the array of magnets and the surface of the graphite body is adjustable depending on the speed of rotation of the array, in order to maintain its rotation speed approximately constant. It will be appreciated that the efficiency of heating of the graphite body tends to decrease at both at high and very low rotation speeds, and adjustment of the distance between the array of magnets and the surface of the graphite block can be used to adjust the load drawn from the energy source and thus the available energy to drive the rotation of the array. Increasing the space between the magnets and the graphite body will tend to cause the array to rotate faster and conversely decreasing the space will tend to cause the array to rotate more slowly. Typically, this space is adjusted automatically as the rotation speed of the array changes, for example by the inclusion of a governor mechanism in the rotation shaft. Thus the rotation speed of the array of magnets may be sustained within an optimum range, typically from about 1 to 2 revolutions per second, excess energy over that required to sustain the rotation of the array being utilised to heat the graphite body. The shaft which connects the driving device (such as a windmill or water turbine) with the array of magnets may additionally be fitted with a centrifugal brake designed to operate at rotation speeds in excess of the desired maximum operating speed. Typically the maximum operating rotation speed will be about 2 revolutions per second, but may be up to 3, 4, 5, 6, 8, 10 or more revolutions per second. Similarly, although the optimum rotation speed is typically in the range of from 1–2 revolutions per second, rotation speeds of down to about 0.8, 0.6, 0.5, 0.4, 0.3, 0.2, or 0.1 revolutions per second may be used.

As disclosed herein above, the first body of graphite may be surrounded by air when it is to be heated to temperatures below which significant oxidation of the graphite occurs, or it may be housed in a housing which is evacuated. In the latter case, when the first body of graphite is heated by eddy currents induced by moving a magnetic field relative to the body of graphite, the magnetic field source may be inside the housing or outside it. Where the magnetic field source is outside the housing, the housing, or at least the portion of it penetrated by the magnetic field, is of a non-magnetic, non-electrically conducting material. Generally, however, both the graphite body and the magnetic field source are housed within an evacuated housing such as described herein above. It will be appreciated that locating the graphite body in a vacuum substantially limits loss of heat from the graphite body to radiative loss. In addition, the radiative loss of heat from a graphite body includes only low levels of short wave radiation, tending to protect magnets from overheating when they are positioned adjacent the graphite body in a vacuum. As disclosed above, in such a situation it is typical to cover the side of the side of the magnets which faces the graphite body with a thickness of ceramic insulation. More typically, the ceramic insulation is selected so as to absorb at least the wavelengths predominantly radiated by the graphite body at its temperature of operation.

Where both the graphite body and the magnetic field source are housed within an evacuated housing the apparatus of the invention typically includes means whereby the array of magnets may be rotated while maintaining vacuum in the housing. For example, the shaft to which the array of magnets is connected may include a vacuum seal where it passes through the housing, or a rotatable array of magnets inside the housing may be coupled magnetically to a driven shaft outside the housing. Suitable vacuum seals and magnetic couplings are well known in the art. In will be appreciated that where a magnetic coupling is utilised at least the portion of the housing adjacent the magnetic coupling must be non-magnetic (to allow the coupling magnetic field to penetrate the housing) and also non-electrically conducting (or else eddy current heating of this region will occur).

Generally, where magnetically-induced eddy current heating is used to heat the first body of graphite, the graphite body is either of high purity graphite, for example up to 99.99 weight % crystalline graphite as disclosed above, or else is inlaid or overlaid with a thickness of fine grain crystalline graphite having a purity of up to 99.99 weight % in the region where the magnetic field penetrates the graphite body. In this context, the term "fine grain crystalline graphite" refers to crystalline graphite having a specific gravity of at least 2.0, and preferably from 2.1 to 2.2. The thickness of the inlay or overlay, where used, is approximately equal to or greater than the maximum magnetic field penetration into the graphite used. Where an inlay or overlay of such high purity graphite is used this is generally in efficient thermal contact with the part of the graphite body in which or on which it is inlaid or overlaid.

Where solar energy is used for directly heating the first body of graphite, a lens may be used which takes the form of an elongated prism having a cross-section in the form of a segment of a circle or of a parabola. The lens is usually constructed of glass, silica or high purity silica, more usually silica or optical clear glass, and even more usually optical clear glass. With suitable orientation of this type of lens, sunlight may be brought to an approximate focus at the surface of the graphite body at all times of the day when sunlight is at its most intense (that is, the hours either side of midday) and over all seasons of the year, without the need or complicated and expensive equipment for tracking the sun as it moves across the sky. It will be appreciated that, because of graphite's high thermal conductivity, it is not necessary, in order for solar energy to be effectively and efficiently utilised for heating the graphite body, for the solar energy to be brought to a sharp focus at the surface of the body at all times of the day or at all times of the year.

A suitable lens is an elongated cylindrical lens having plano-convex cross-section, in which the length of the lens is substantially greater than the width. While it is possible to produce such a lens by grinding, the present invention provides a means for producing such a lens by moulding a suitable optical material into the desired shape.

Thus, according to a fourth embodiment of the present invention, there is provided a process for moulding a lens, comprising flowing a softened optical material into a lens-defining region of a mould having at least two parts, wherein the softened optical material is caused to flow into the lens-defining region by pressure applied to the softened optical material.

Generally, the process of the fourth embodiment comprises:

forming a mould comprising first and second parts, a surface of said first part and a surface of said second part each comprising a moulding region, which moulding regions together form said lens-defining region, bringing said parts into contact with an optical material to form an assembly, the volume of said optical material being at least equal to the volume of said lens, wherein said moulding regions are substantially opposed and said optical material is disposed between said moulding regions, heating said assembly and applying pressure to said optical material, wherein said heating and application of pressure are at a temperature and for a time sufficient for said optical material to soften and conform to said lens-defining region, allowing said assembly to cool, releasing said optical material from said mould and if appropriate trimming excess optical material from the lens thus formed.

More generally, the mould comprises upper and lower parts. Usually, the pressure applied to the optical material is the weight of one of the mould parts.

Thus, typically, the process of the fourth embodiment comprises:

forming a mould comprising upper and lower parts, the upper surface of the lower part and the lower surface of the upper part each comprising a region, which regions together define the desired shape of the lens, arranging the lower part of the mould substantially horizontally and placing thereon a block of optical material, the volume of the optical material being at least equal to the volume of the desired lens, placing the upper part of the mould on the block of optical material so that the lens-defining regions of the upper and lower parts are in alignment, heating the assembly to a temperature and for a time sufficient to soften the optical material, allowing the assembly to cool, releasing the optical material from the mould and if appropriate trimming excess optical material from the lens thus formed;

wherein the mass of the upper portion is sufficient to cause the softened optical material to flow into the lens-defining regions of the mould.

Typically, in this form of the process of the fourth embodiment, the mould is made of graphite and the surfaces of the lens-defining regions are polished. The surface of one of the lens-defining regions may be substantially flat. In the latter case, the upper part of the mould conveniently has the flat surface. Where the mould is graphite, the heating step is typically carried out in an oven at reduced pressure, for example from 10 Pa to about 20 kPa, more typically on the range of from about 50 Pa to about 10 kPa, still more typically in the range of from about 100 Pa to about 1 kPa. Typically, the optical material used is optical glass, and the heating is carried out by gradually heating the assembly of mould and optical material to from 830–900° C., more typically about 850° C. When the optical material used is fused silica, quartz or silica glass, the heating is carried out by gradually heating the assembly of mould and optical material to from 1430–1500° C., more typically about 1450° C.

The heat stored in the apparatus of the first embodiment may be utilised for any suitable purpose. For example, a fluid heated in the apparatus of the invention may be used for industrial processes, heating buildings, heating water, absorption refrigeration, industrial or agricultural drying or for the generation of rotary motive power for transport, pumping or for electricity generation.

Alternatively, the apparatus of the first embodiment may be utilised for the production of rotary motive power in an automobile or similar vehicle. In that case, energy stored by heating the graphite bodies may be used to power the vehicle, so providing a relatively cheap and non-polluting source of energy for transportation.

Where the apparatus is used for the conversion of heat energy into rotary motive power, chambers or tubes in the graphite bodies are adapted to be in communication via one or more pipes with an expansion engine charged with a gas. Generally, the graphite bodies comprise internal channel adapted to be in communication via one or more pipes with the expansion engine. Usually, the gas will be under pressure. The gas may be air, nitrogen, oxygen, or other gas relatively unreactive to graphite at the temperatures of operation. Usually, the gas will be air. Suitably, the expansion engine is a Stirling engine. The expansion engine may be operated at pressures from one atmosphere to 20 kPa. Usually, the expansion engine will be operated at pressures from 70 kPa to 25 kPa, more usually from 30 kPa to 40 kPa. Suitably, the temperature of the graphite with which the gas is brought into thermal contact will be from 500° C. to 1300° C. Usually the temperature of the graphite will be from 900° C. to 1100° C.

The Stirling engine may form part of the engine of an automobile in which, when the automobile is accelerated, the expanded gases drive a pair of reciprocating pistons which are coupled to the vehicle's driving wheels, draining energy from the heat stored in the graphite bodies in doing so. When the vehicle decelerates, the pistons act as compressors, causing the circulating gas to heat. As the compressed gas passes through the graphite blocks of the apparatus of the invention it then returns heat to the blocks. The overall result is a highly efficient conversion of heat energy into motion.

The invention will be illustrated with reference to the following drawings. It will be appreciated that the invention is not to be construed to be limited to the embodiments shown in the accompanying drawings.

BEST MODE AND OTHER MODES OF CARRYING OUT THE INVENTION

Figure 1:
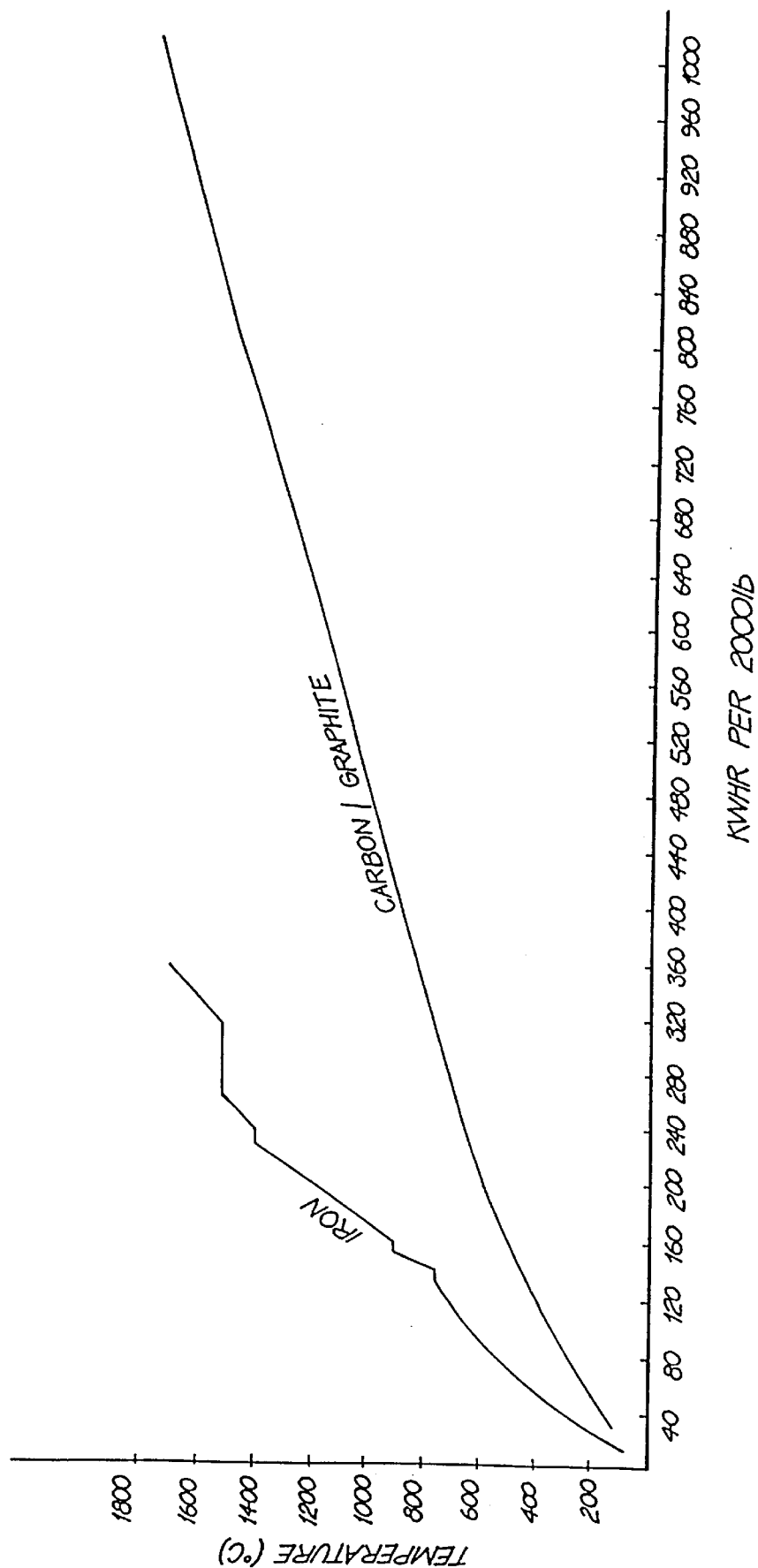
FIG. 1 is a graph depicting the relationship between the temperature of solid natural graphite and the amount of energy it is capable of absorbing.

FIG. 1 presents a graph which shows the relationship between the heat capacity of graphite and iron as a function of their temperature, and shows the much higher heat capacity, particularly at relatively high temperatures, of graphite. This large heat capacity at elevated temperatures provides an advantage, when energy storage in graphite is compared to other methods of energy storage, which is utilised in the embodiments of the present invention described below.

Figure 2:
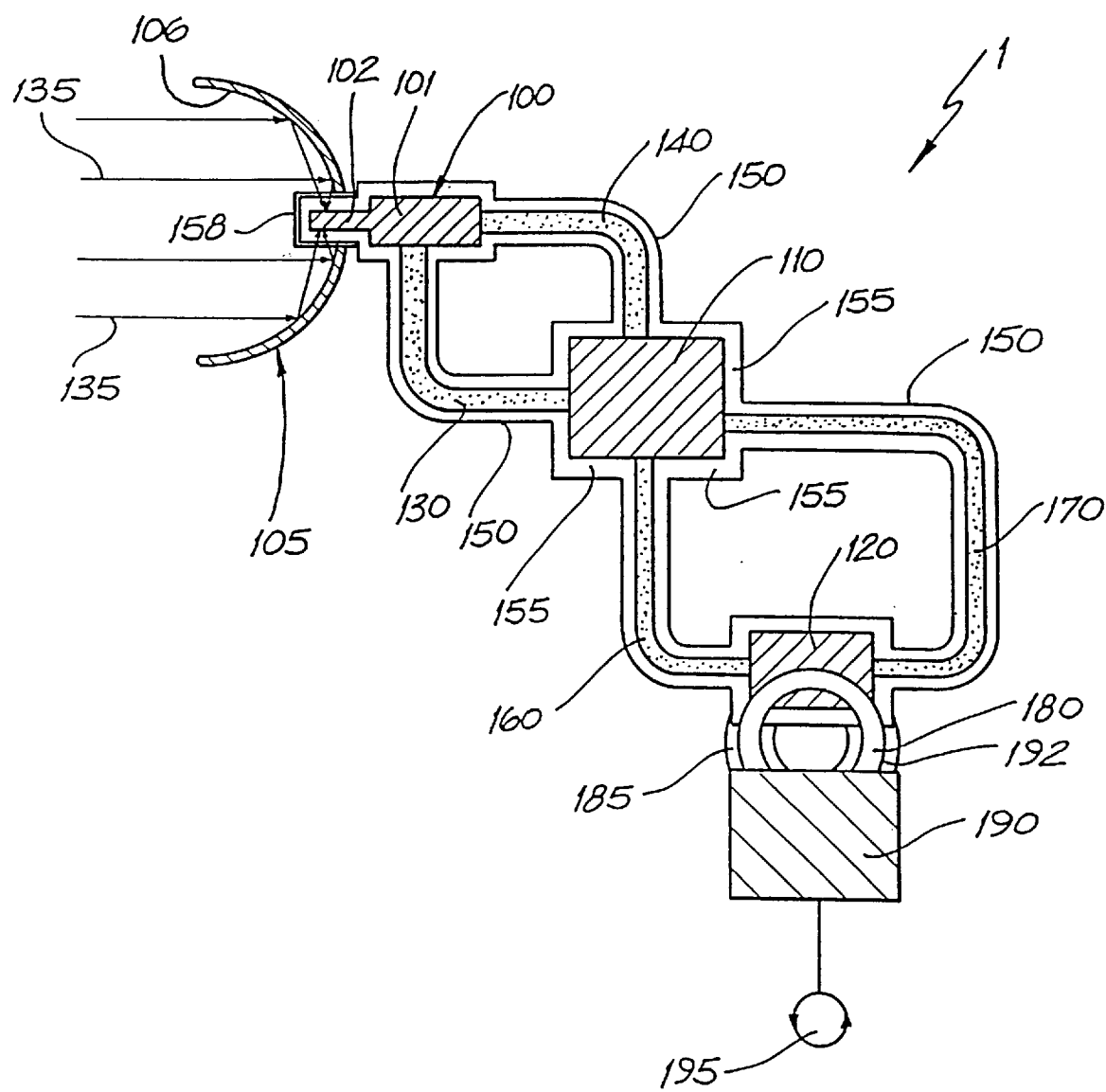
FIG. 2 is a schematic representation of one form of the first embodiment of the invention a an apparatus for converting solar energy into rotary motive power.

FIG. 2 provides a schematic representation of an embodiment of the invention which is an apparatus for the conversion of solar energy into rotary motive power. Apparatus 1 includes three graphite blocks 100, 110 and 120. Blocks 100 and 110 are interconnected by means of Floveyer 130, 140 which transports graphite particles through block 110 (channel not shown) via leg 130 to block 110, through block 110 (channel not shown) and via let 140 back to block 100. Blocks 110 and 120 are similarly interconnected by means of Floveyer 160, 170 (channels through blocks 110, 120 not shown). The assembly of blocks 100, 110, 120 and Floveyers 130, 140 and 160, 170 are provided with an external jacket 150 separated from the blocks and Floveyers by a sealed evacuated space 155. Vacuum is generated in space 155 by means of a vacuum pump (not shown) connected to jacket 150 and operated so as to reduce the pressure in jacket 150 to a desired value and maintain it at that value. Typically, the pressure in jacket 150 is maintained at or below about 5.5 kPa.

Figure 4:
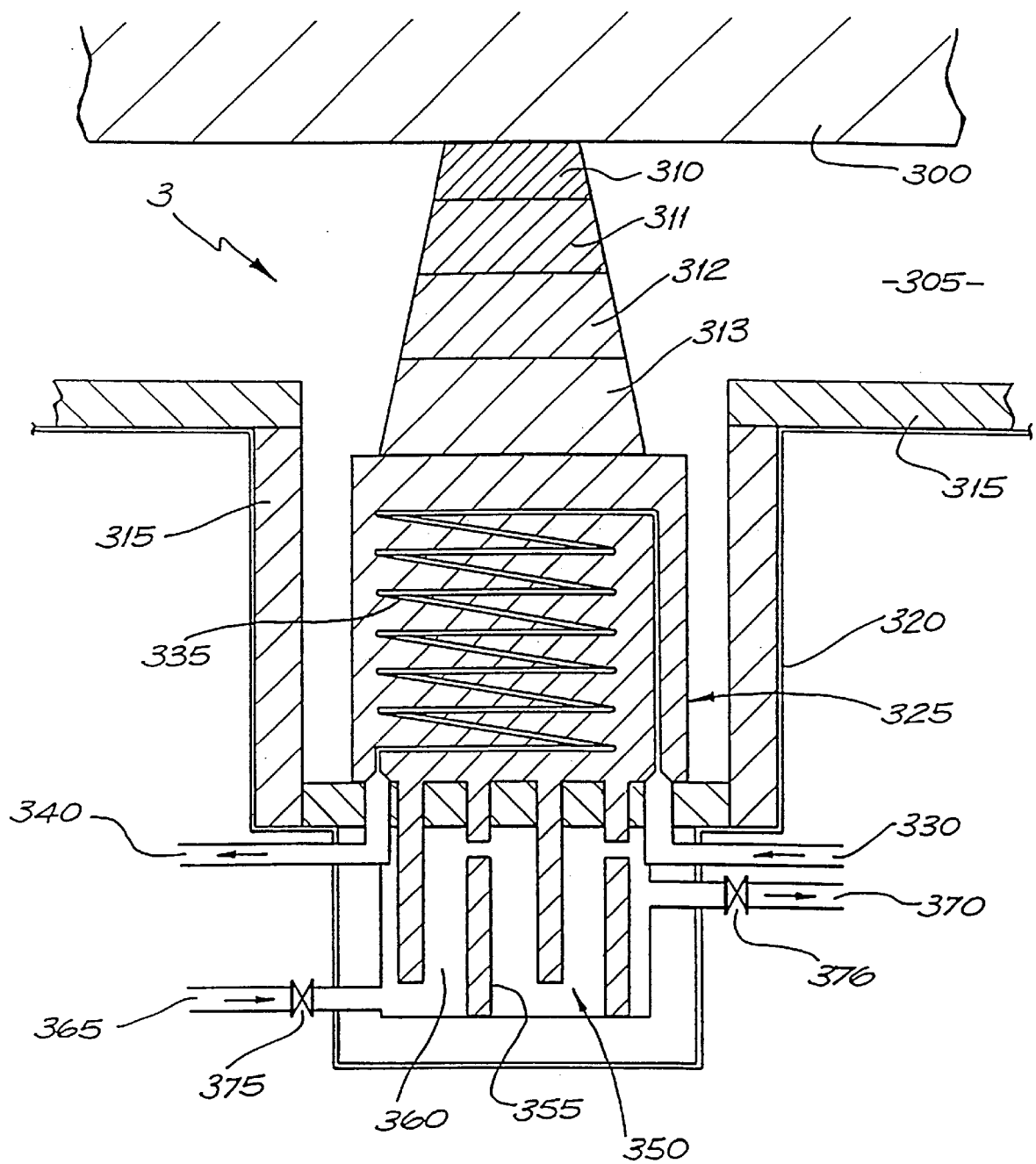
FIG. 4 is a schematic representation of a an insulating spacer assembly for use in the apparatus represented in FIG. 2 or FIG. 3.

Block 100 consists of a main body 101 and an elongated relatively narrower extension 102. External jacket 150 is provided with a window 158 which is transparent to infrared light, surrounding the elongated portion 102 of block 100. Transparent window 158 is manufactured from high purity silica. The remainder of external jacket 150 is constructed from stainless steel, the interior surfaces of which are highly polished. Graphite blocks 100, 110 and 120 are separated from external jacket 150 by means of insulating spacers (not shown) constructed from an efficient thermal insulator material. Suitable such insulating spacers are illustrated in FIG. 4 and described below.

Surrounding external window 158 is a paraboloidal solar energy collector 105 having a reflective interior surface 106 directed towards the sun.

Apparatus 1 additionally includes expansion engine 190 which is connected to block 120 by means of a number of tubes 192 passing through block 120. Tubes 192 are hollow and filled with pressurised air 180. Thermal insulation 185 is provided where tubes 192 are exposed to the external surroundings.

In operation, solar energy 135 strikes reflective surface 106 of collector 105 and is reflected through transparent window 158 onto the elongated portion 102 of first graphite block 100, causing block 100 to be heated. Heat is transferred from block 100 to block 110 via Floveyer arm 130, and graphite particles transferred through Floveyer 130 from block 100 to block 110 are returned to block 100 via arm 140. Heat is transferred from block 110 to expansion engine 190 by use of block 120. Floveyer arm 160 transports heated graphite particles from block 110 through block 120 and returns relatively cooler graphite particles via arm 170 to block 110. Pressurised air in tubes 192 which passes through block 120 is thereby heated and expands. Expands air passes into expansion engine 190 where it does work, the work being extracted as rotary motive power 195. Relatively cooler and less expanded air is returned to block 120 via tube 192.

Figure 3:
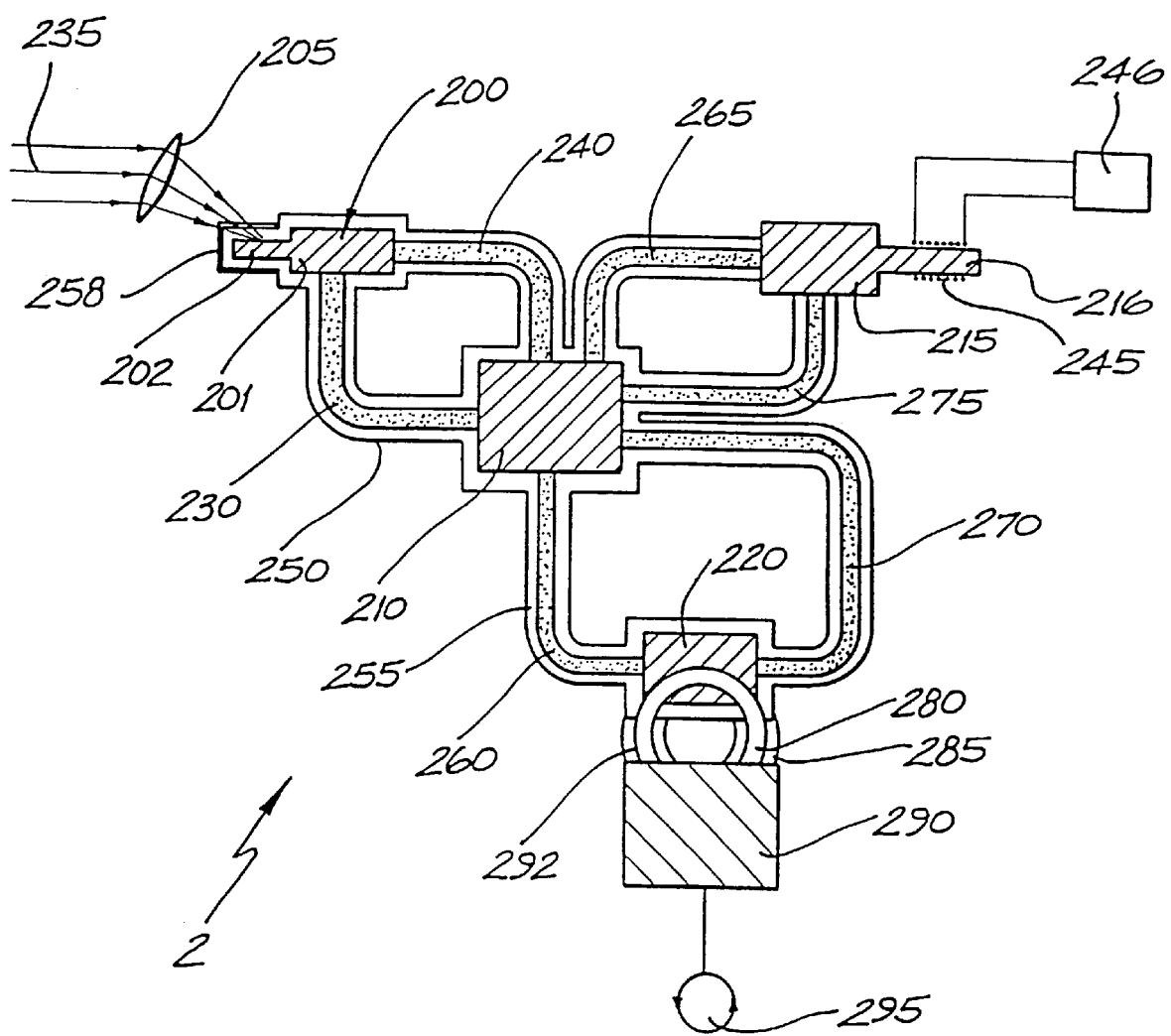
FIG. 3 is a schematic representation of an alternative form of the first embodiment of the invention as an apparatus for converting solar energy and/or electrical energy into rotary motive power.

FIG. 3 provides a schematic representation of an alternative embodiment of the invention for the conversion of solar and electrical energy into rotary motive power. In the apparatus represented in FIG. 3, items 200, 201, 202, 210, 220, 230, 240, 250, 255, 258, 260, 270, 280, 285, 290, 292, and 295 are the same as items 100, 101, 102, 110, 120, 130, 140, 150, 155, 158, 160, 170, 180, 185, 190, 192 and 195 of FIG. 2.

Apparatus 2 represented in FIG. 3 includes an additional graphite block 215, having a narrower elongated portion 216. Floveyer 265, 275 transports graphite particles through block 215 (channel not shown) via leg 265 to block 210, through block 210 (channel not shown) and via leg 275 back to block 215. Induction coil 245 is wound around elongated portion of block 216 and is connected to a source alternating current 246.

Graphite block 200 is heated by solar energy 235 directed onto it through window 258 after being focussed by lens 205.

In use, block 200 is heated by solar energy at times when the sun is shining, and once block 200 reaches a suitable temperature excess heat is transferred to block 210 for storage by starting Floveyer 230, 240. At times when the energy provided by solar radiation is insufficient, block 215 provides an alternative source of heat. A.c. current source 246 is turned on, causing current to flow through coil 245, which induces eddy currents in graphite block 216, thereby heating it. When block 215 reaches a suitable temperature, Floveyer 265, 275 is started and the excess heat produced by in block 215 by coil 245 is transferred to block 210 for storage.

FIG. 4 is a schematic representation of a an insulating spacer assembly for use in the apparatus represented in FIG. 2 or FIG. 3. The assembly supports graphite block 300, which corresponds to any one of the blocks 100, 110, 120, 200, 210, 215 or 220 shown in FIG. 2 or FIG. 3, and separates it from external jacket 320 (which corresponds to jacket 150 or 250) which is insulated internally by silica based thermal insulation 315 for reflecting long wavelength radiation from graphite block 300. Thermal insulation 315 may also be a glass mirror or other reflective surface. Space 305 is evacuated. Insulating spacer assembly 3 consists of four layers of ceramic thermal insulators 310, 311, 312 and 313, main heat exchanger 325 and secondary heat exchanger 350. The ceramic thermal insulators 310–313 incorporate differing amounts of graphite impregnation, the amount of impregnated graphite being greatest in layer 310 which is in thermal contact with graphite block 300, and least in layer 313 which is in thermal contact with main heat exchanger 325. Layers 311 and 312 are in thermal contact with the adjacent layers. Layer 313 may contain no graphite impregnation, depending on the desired operating temperature of the heat exchanger. By selecting the amount of graphite impregnation in the ceramic thermal insulators 310–313, conduction of heat away from graphite block 300 may be minimised while permitting ceramic thermal insulators 310–313 each to be maintained at a temperature below that at which they lose structural strength.

Main heat exchanger 325 is a graphite block which has one or more channels 335 formed in it for the passage of gas, channel 335 being connected to gas inlet 330 and gas outlet 340. An extension 355 of the graphite block of main heat exchanger 325 protrudes into and forms part of secondary heat exchanger 350, being surrounded by an arrangement of channels 360 which provide a serpentine path for gas from gas inlet 365 to gas outlet 370. Both gas inlet 365 and gas outlet 370 are fitted with normally-closed temperature controlled valves 375 and 376. A thermal sensor such as a bimetal strip (not shown) causes valves 375, 376 to open when the temperature of main heat exchanger 325 exceeds a preset value. Gas outlet 370 to secondary heat exchanger 350 is connected to a long thermally insulated stack (not shown).

Ceramic thermal insulators 310–313 are of alumina, silica, magnesite, zircon or osmium oxide, depending on their temperature of operation. Alternatively thermal insulator 310 may be Kaowool TBM2830, which is capable of sustaining a thermal gradient of approximately 350° C./cm across its width. Typically, graphite block 300 is maintained at a temperature of about 1800° C., and main heat exchanger 325 is maintained at a temperature of about 100–350° C. When insulator 310 is Kaowool TBM2830, the upper face temperature of insulator 311 is typically about 300° C. and main heat exchanger 325 is maintained at a temperature of about 100° C. The orientation of insulating spacer assembly 3 is shown in FIG. 4 as vertically upright; however it may also be arranged horizontally, or vertically inverted so as to support graphite block 300 from above, below or the sides. The shape of insulating spacer assembly is in the form of a truncated cone, as shown, so as to provide a desired thermal gradient from the hot to the cold face of the insulator assembly 3.

In use, cold air is admitted to inlet 330 and heated air is removed from outlet 340. In normal operation, the passage of air through main heat exchanger is sufficient to remove substantially all heat conducted through layers 310–313 of the ceramic thermal insulators and secondary heat exchanger 350 is not required. The hot gas from outlet 340 may be used to preheat the pressured air (180 and 280 in FIGS. 2 and 3 respectively) used to drive the expansion engine. In this way, substantially all the heat energy stored in graphite block 300 is utilised for the production of rotary motive power. If the temperature sensor (not shown) in main heat exchanger 325 causes valves 375, 376 to open and convection causes cool air to be drawn into inlet 365, through channels 360 and out of the stack (not shown) via outlet 370. As a result, main heat exchanger 325 is cooled, and when its temperature falls below a predetermined value, the temperature sensor (not shown) causes valves 375, 376 to close again.

Figure 5A:
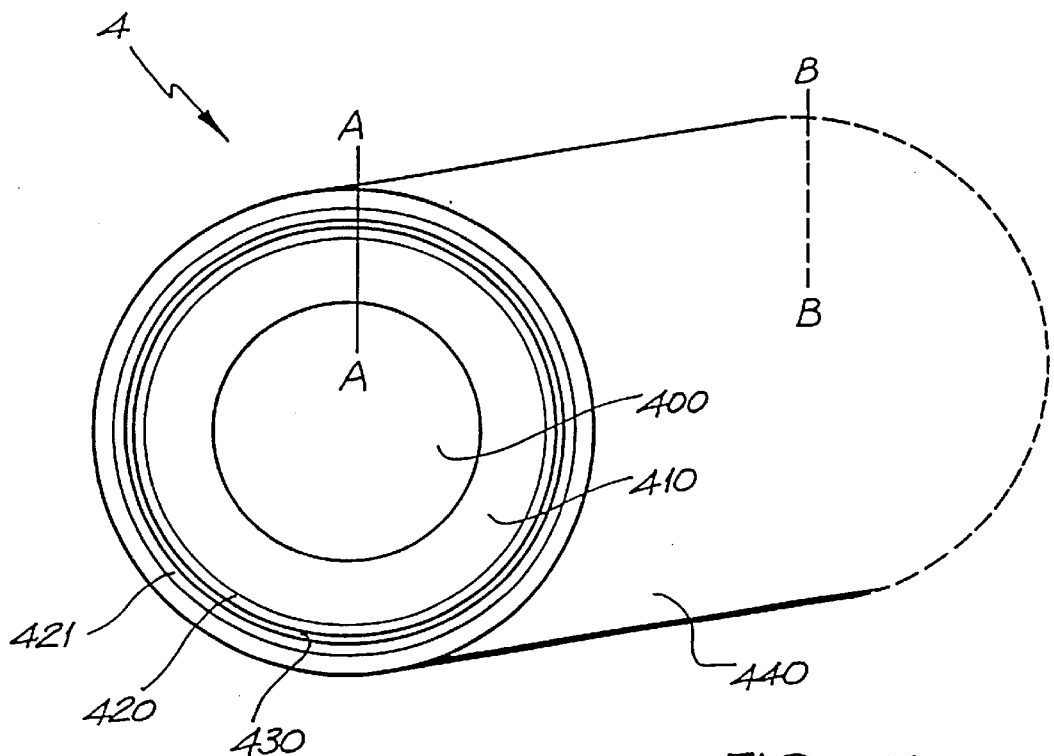
FIG. 5A is a perspective view of an assembly for use in inductive heating of a graphite body.
Figure 5B:
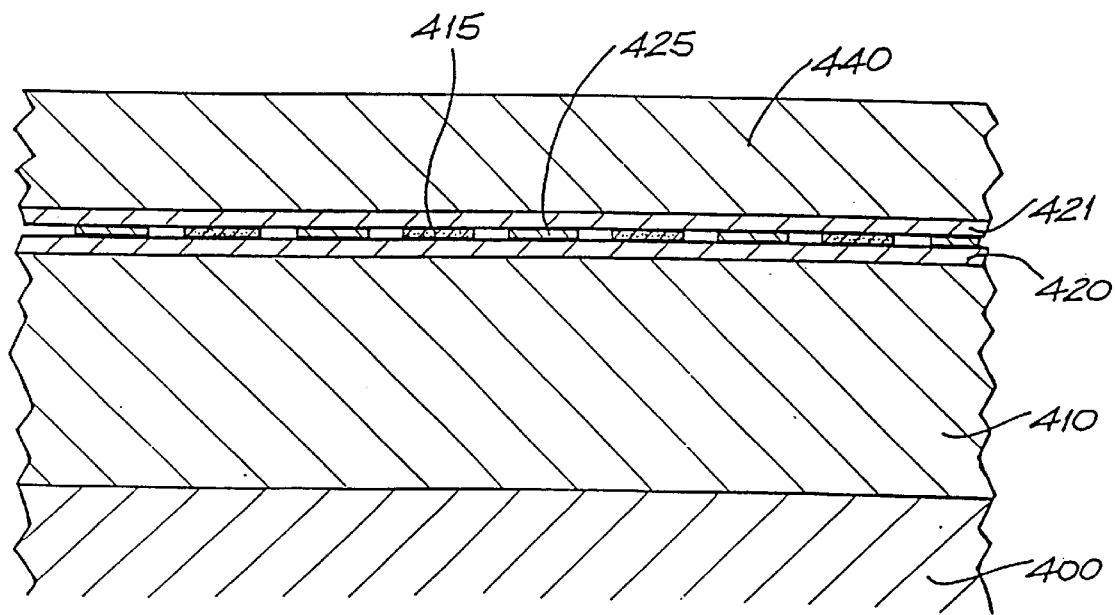
FIG. 5B is a section in plane AA–BB of the assembly shown in FIG. 5A.

FIGS. 5A and 5B illustrate an assembly 4 for use in inductive heating of a graphite body. FIG. 5A provides a perspective view of the assembly, which consists of a core of graphite 400 which is surrounded by an inner solid graphite layer 410, the outer surface of which is covered by an inner layer of electrical insulation 420, separated by a space 430 from an outer layer of electrical insulation 421. Core 400 is either solid graphite or graphite powder and is either part of a graphite block of the apparatus represented in FIG. 2 or FIG. 3 or is in thermal communication with one such graphite block. Assembly 4 represented in FIG. 5A is generally cylindrical; however any other convenient shape, for example square or rectangular section, may be used. Assembly 4 is covered with an outer solid graphite layer 440. Inner and outer graphite layers 410, 440 are thermally connected (connection not shown) by graphite or metallic conductors, so that each remains at essentially the same temperature as the other. Inner and outer layers of electrical insulation 420 and 421 are separated by a strip of electrical insulation 425 (best seen in FIG. 5B, which is a section in plane AA–BB of the assembly shown in FIG. 5A) which is wound in a spiral around inner layer of insulation 420. In the spaces between the windings of insulator 425 is wound a strip of graphite cloth or graphite fibre 415 for conducting electricity. The thickness of outer graphite layer 440, and of inner graphite layer 410 together with core 400 are each at least 150 mm. Inner graphite layer 410 may be omitted, in which case core 400 is thermally connected to outer layer 440.

In use, graphite cloth or graphite fibre 415 is connected to a source of alternating current (not shown) which passes through graphite cloth or graphite fibre 415 and inductively heats the inner and outer layers of graphite 410 and 440 as well as graphite core 400.

Figure 6:
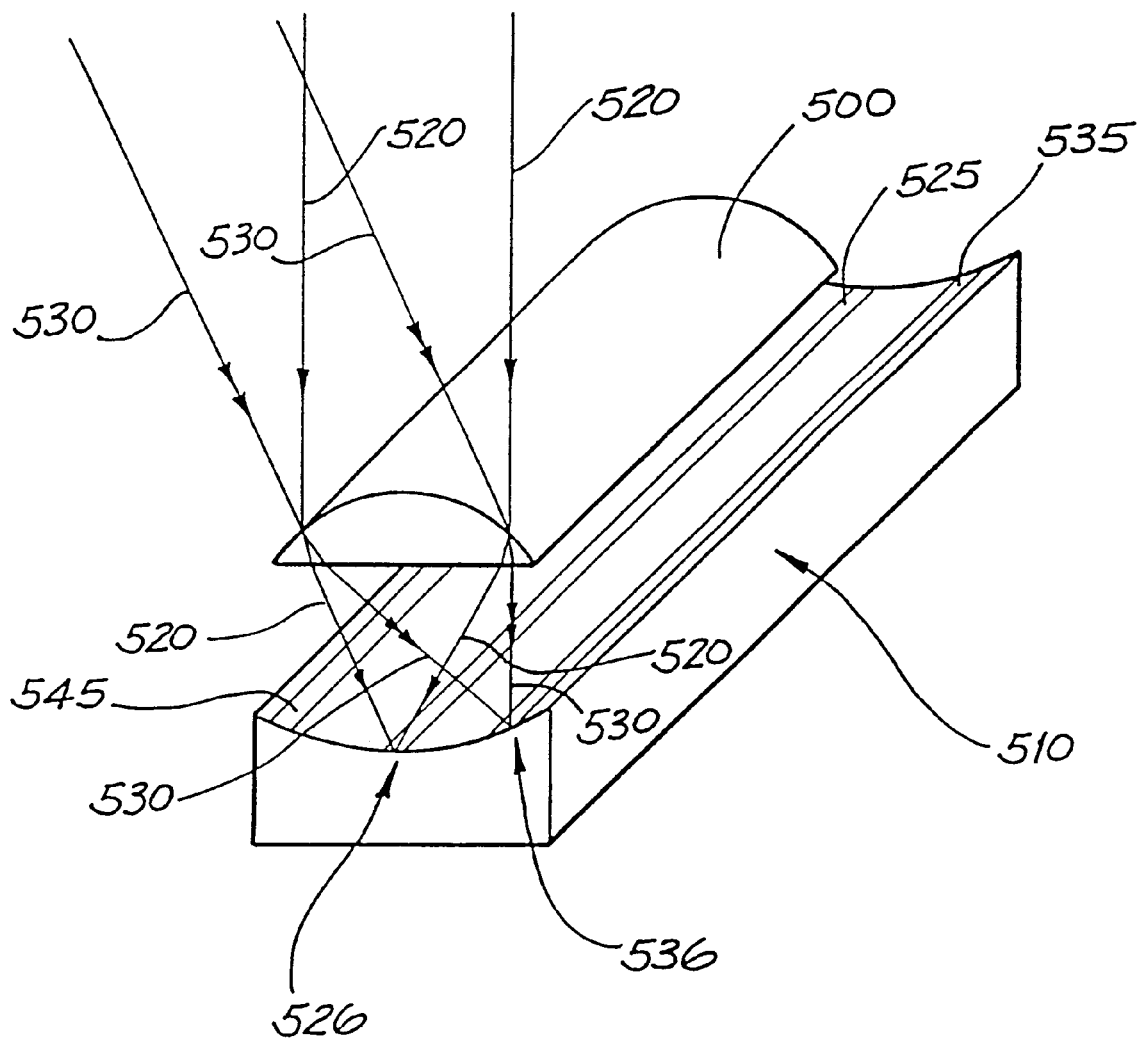
FIG. 6 is a diagrammatic representation of a lens suitable for directing solar radiation onto a part of an apparatus according to the invention.

FIG. 6 is a diagrammatic representation of a lens suitable for use in directing solar radiation onto a graphite body in an apparatus according to the invention, for the purpose of heating it.

Lens 500 of optical clear glass has a cross-section of a segment of a circle, and is much longer than it is wide. Typical dimensions of lens 500 are 1 meter long by 190 mm wide. Typically, the focal length of lens 500 is about 395 mm. Lens 500 is positioned above graphite body 510, which is substantially longer than lens 500. Lens 500 and graphite body 510 are arranged parallel in a generally upright position and with the longitudinal axis of lens 500 inclined to the vertical so that light at noon on a day at approximately the equinoxes falls substantially perpendicular to the flat face of lens 500. The upper face of graphite body 510 is concave, with a radius of curvature approximately equal to the focal length of lens 500. At midday on the equinoxes, solar radiation 520 impinges on the upper curved surface of the lens and is diffracted by the lens so as to be brought to an approximate focus at a point 526 below the lens. Earlier or later in the day, solar radiation 530 impinges at a much lower angle on the lens and is brought to an approximate focus at a different point 536 on the upper surface of graphite body 510.

the spacing between lens 500 and graphite body 510 is arranged so that the two approximate points of focus 526, 536 lie on or close to the surface of the graphite. The light is not brought to a perfect focus at any time of the day, owing to aberration of the lens and to the range of wavelengths which occur in sunlight. Therefore, a somewhat blurred focus is produced at the surface of graphite body 510. Owing to the elongated shape of the lens, incident light is focussed not as a spot as occurs with spherical lenses, but as a band along the length of graphite body 510. Thus at midday band 525 is produced, and early and late in the day bands 535 and 545 respectively are produced. At other times of the day, a band of approximately focussed light is produced intermediate the positions of bands 535 and 545. Variation in the angle of declination of the sun with the season of the year causes the bands to move gradually one way or the other in the direction of the longitudinal axis of lens 500. By the use of a lens of suitably large size, an amount of solar radiation can be directed onto the surface of body 510 to produce the desired degree of heating of body 510.

Figure 7:
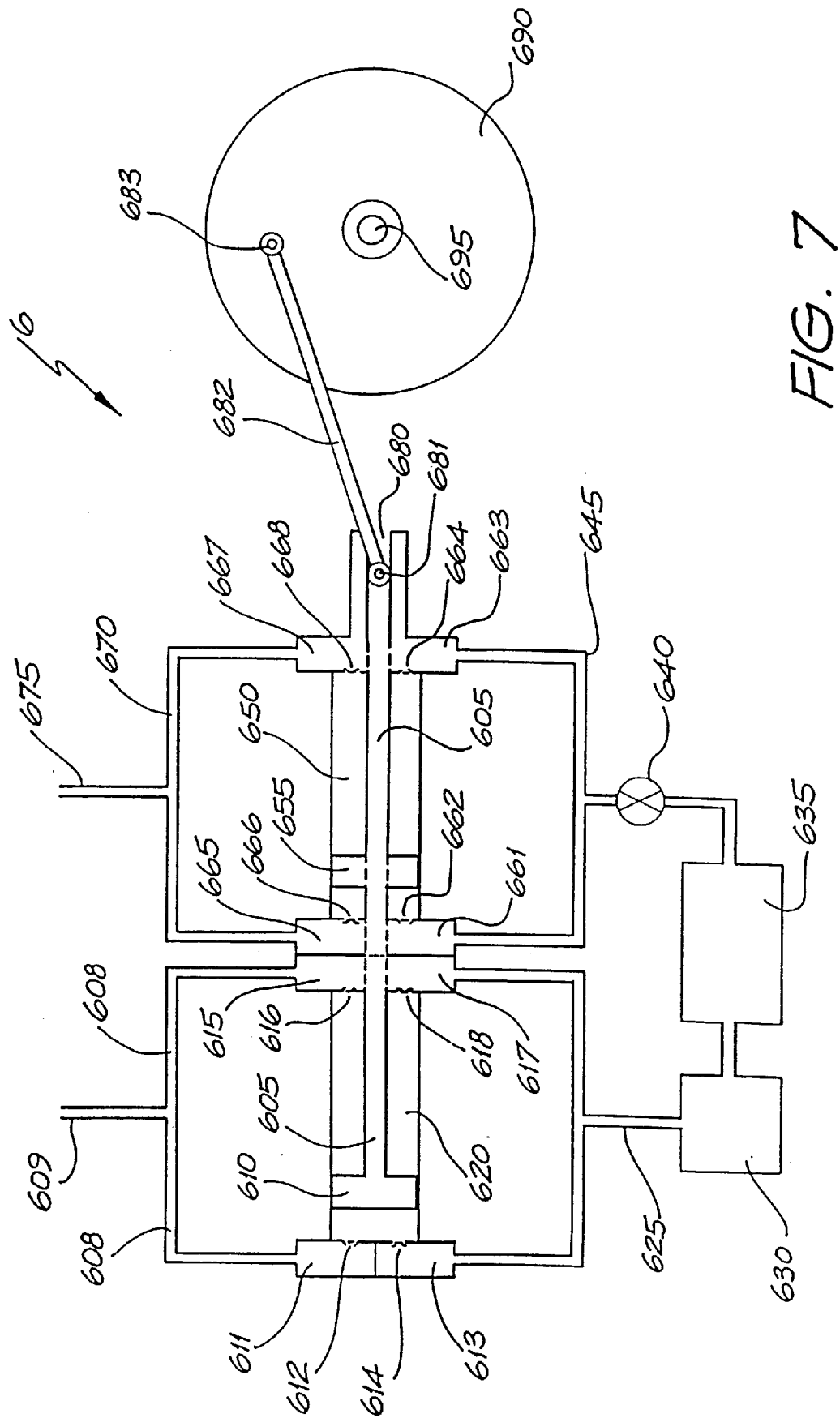
FIG. 7 is a diagrammatic representation of a heat engine suitable for use in the apparatus represented in FIG. 2 or FIG. 3.

FIG. 7 is a diagrammatic representation of a Stirling engine suitable for use in an apparatus as shown in FIG. 2 or FIG. 3 for the recovery of rotary motive power therefrom. Engine 6 consists of a pair of cylinders 620, 650 having a single shaft 605 passing through them, shaft 605 carrying piston 655 in cylinder 650 and terminating in piston 610 which runs in cylinder 620. Cylinder 620 acts as a compressor, and cylinder 650 is driven. A seal is formed where shaft 605 exits cylinder 650 and enters 620. The free end of shaft 605 is connected by means of coupling bearing 681 to linkage rod 682, the other end of which is connected off-centre to flywheel 690 by means of coupling bearing 683. Flywheel 690 is mounted on axle 695.

Compressor cylinder 620 is connected to an air inlet 609 by means of pipe 608 which opens into each of two inlet chambers 611 and 615. Chambers 611, 615 are fitted with one-way valves 612, 616 which admit air to cylinder 620. An exhaust path is provided via one-way outlet valves 614, 618 to outlet chambers 613, 617 respectively and thence via pipe 625 to compressed air tank 630. There is no communication between chambers 611 and 613, or between chambers 615 and 617. Air tank 630 is connected to heat exchanger 635 which corresponds generally to graphite block 120 or 220 represented in FIG. 2 or FIG. 3.

Driven cylinder 650 is of similar construction to compressor cylinder 620. Heat exchanger 635 is connected via control valve 640 and pipe 645 to each of two inlet chambers 661, 663, which are equipped with inlet valves 662, 664 respectively. Chambers 665, 667, fitted with exhaust valves 666, 668 respectively provide a path via pipe 670 to exhaust outlet 675. Valves 662, 664, 666 and 668 are operated by means of cams on a cam rod (not shown) coupled by gears to axle 695 of flywheel 690.

In operation, motion of shaft 605 towards the left as shown in FIG. 7 causes inlet valve 616 to open and inlet valve 612 to close. Air is drawn into cylinder 620 behind moving piston 610, and air ahead of piston 610 is compressed until pressure in cylinder 620 causes valve 614 to open, whereupon compressed air is displaced into tank 630 and thence through heat exchanger 635. On the return stroke, operation of compressor cylinder 620 is similar, except that air is drawn through valve 612, with valve 616 being closed, and compressed air is displaced through valve 618, with valve 614 being closed.

Compressed air entering heat exchanger 635 is heated and expands. Expanded air passes via valve 640 and pipe 645 into chamber 663. The cam arrangement on the cam rod (not shown) causes inlet valve 664 and exhaust valve 666 to be open, and valves 662 and 668 to be closed. The entry of expanded air into cylinder 650 via valve 664 causes piston 655 and shaft 605 to be displaced to the left, resulting in rotation of flywheel 690 in an anticlockwise direction. Expanded air is exhausted via valve 666 and pipe 670 to outlet 675. When piston 655 nears the end of its stroke, the cam closes valves 664, 666 and opens valves 662 and 668, causing piston 655 to be displaced to the right, with expanded air entering cylinder via valve 662 and leaving via valve 668. Rotation of flywheel 690 is thereby maintained in the anticlockwise direction. The net effect is removal of heat from heat exchanger 635 and conversion of that heat to useful work in the form of rotation of the flywheel. Machinery of various kinds may be driven by the rotation of axle 695.

Figure 8:
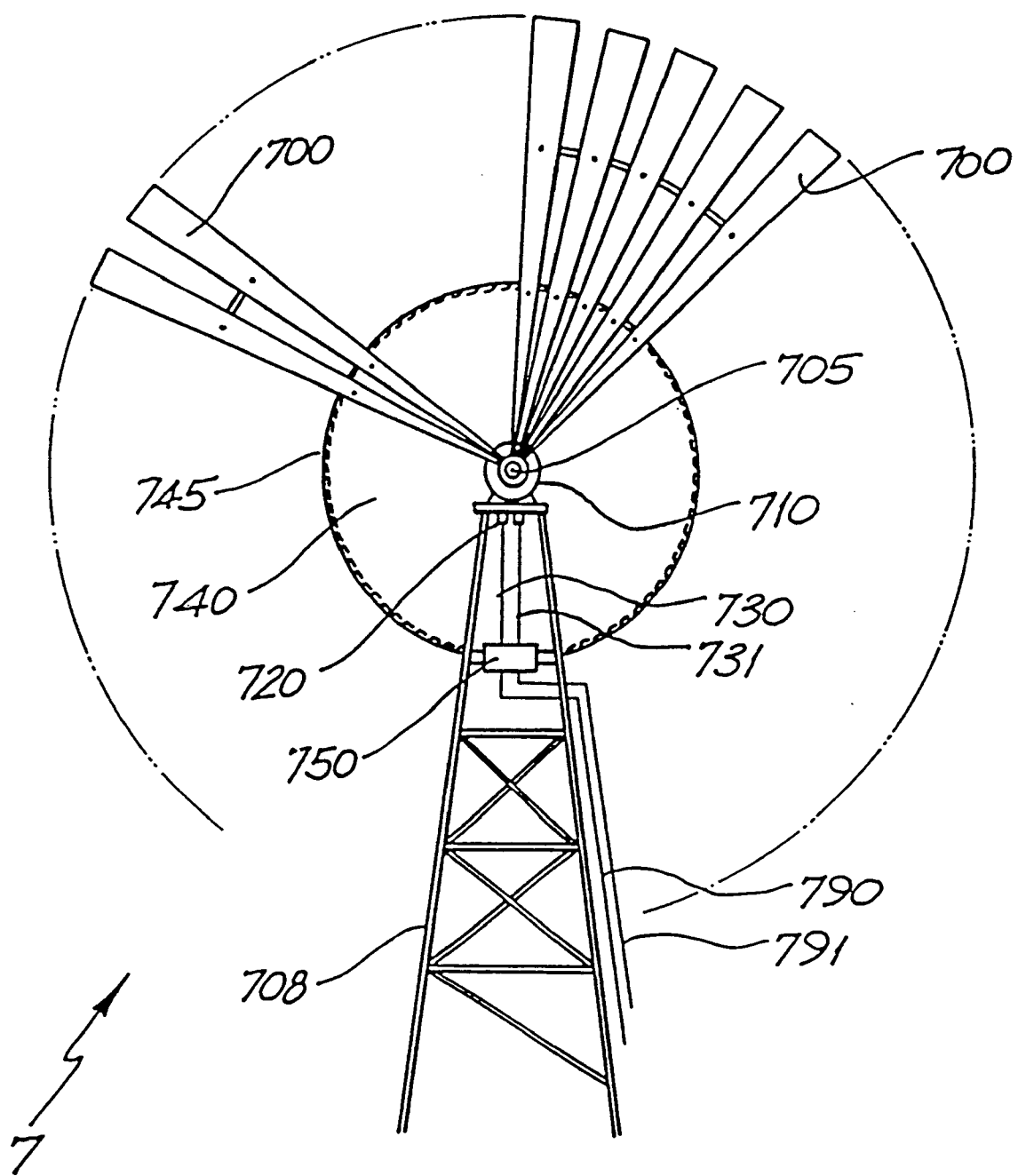
FIG. 8 is a diagrammatic representation of a windmill which is suitable for generating alternating current for use in heating a graphite block in the apparatus represented in FIG. 2 or FIG. 3.

FIG. 8 is a diagrammatic representation of a windmill which is suitable for generating alternating current for use in heating a graphite block in the apparatus represented in FIG. 2 or FIG. 3. Referring to FIG. 8, windmill 7 consists of a number of blades 700 (only some shown) which are designed and pitched at an angle so as to produce high torque at low speeds. Blades 700 are spaced evenly in a circular arrangement as is conventional in windmill design, and are attached to and radiate from axle 705 which is mounted on frame 708. Axle 705 drives a conventional d.c. generator 710. Brushes 720 on the generator conduct electricity from generator 710 via wires 730, 731 to a.c. converter assembly 750, which is described in more detail below with reference to FIG. 8C. Alternating current is conducted from windmill 7 by wires 790, 791. Also mounted on axle 705 is a disc or ring 740 having approximately 1000 sinusoidal undulations 745 around its periphery. Disc or ring 740 may be metal or rigid plastic. It is preferably a ring, supported in place by a number of radial struts (not shown) connecting it to axle 705. Axle 705 also carries a governor assembly (not shown) which regulates the rotational speed of the windmill.

Figure 8A:
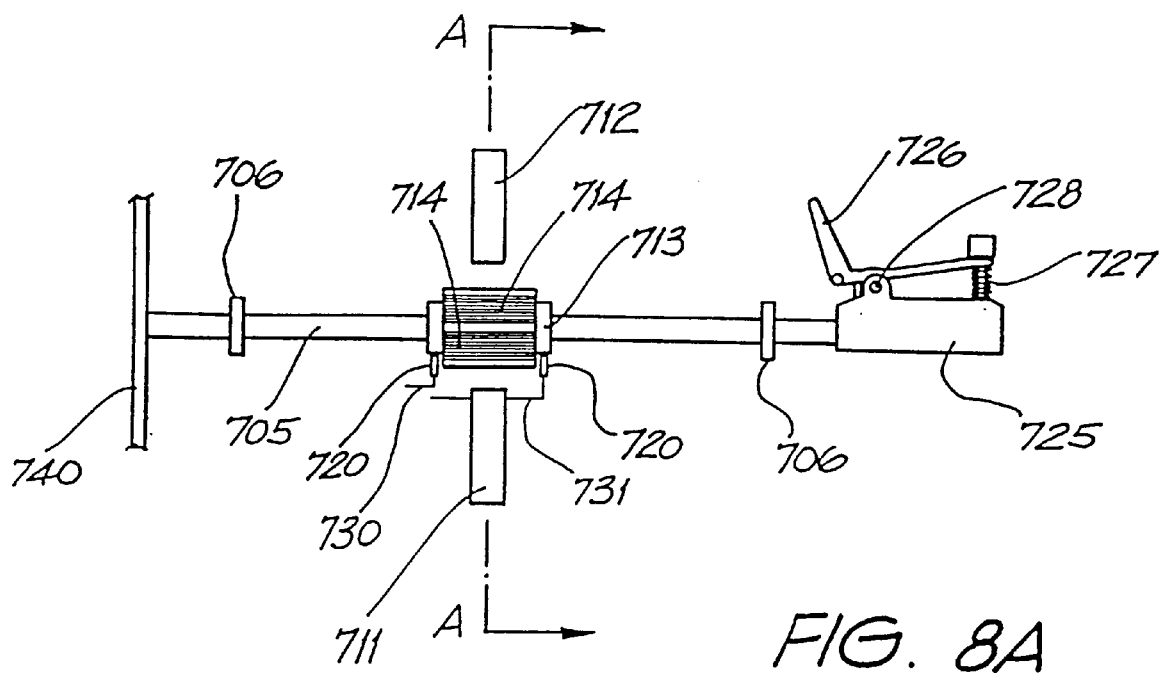
FIG. 8A is a diagrammatic representation of a governor assembly for use in the windmill illustrated in FIG. 8
Figure 8B:
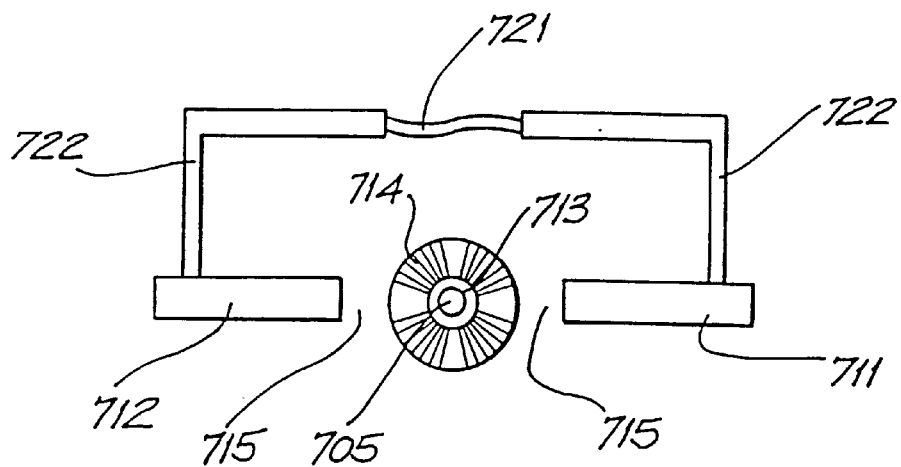
FIG. 8B is a section along line A—A of the governor assembly represented in FIG. 8A.

The mechanism whereby the rotational speed of windmill 7 is regulated may be better understood by reference to FIGS. 8A and 8B. FIG. 8A provides a diagrammatic representation of the regulator assembly in plan view, and FIG. 8B provides a section along the line A—A in FIG. 8A. Referring to FIG. 8A, shaft 705, which is seen end-on in FIG. 8, is seen in plan view, with disc or ring 740 at one end. Shaft 705 is mounted for rotation in bearings 706 and carries generator 710 mounted coaxially thereon. Generator 710 consists of a rotor body 713 carrying windings 714, positioned between the poles 711, 712 of a magnet. Windings 714 terminate on conductive surfaces at the ends of rotor 713, which are contracted by a pair brushes 720, carrying wires 730, 731 which conduct d.c. generated by the windmill. At the end of shaft 705 remote from disc or ring 740 is mounted a governor assembly 725 which includes a generally L-shaped actuator lever 726 (only part shown) mounted on pivot 728. The shorter arm of actuator 726 is separated from the body of governor 725 by spring 727. In FIG. 8A, the whole length of the longer arm of actuator is not shown. The free end of this longer arm is connected to the two poles 711, 712 of the magnet is such a way that movement of the longer arm of actuator 726 in one direction causes poles 711, 712 to move apart, and movement of the longer arm of actuator 726 in the other direction causes poles 711, 712 to move together. Poles 711 and 712 are connected by means of struts 722 and flexible link 721, as seen in FIG. 8B (not shown in FIG. 8A).

In operation, with blades 700 of windmill 7 stationary, poles 711 and 712 are relatively far apart. Consequently the air space 715 (see FIG. 8B) between poles 711, 712 and rotor windings 714 is relatively large and the magnetic field experienced by windings 714 is relatively small. When the wind blows, shaft 705 rotates with blades 700, causing rotor 713 and windings 714 to rotate in the magnetic field produced between poles 711, 712 thereby generating a potential difference at brushes 720 and in wires 730, 731. When the wind blows more strongly, the speed of rotation of shaft 705 tends to increase. This increase in the speed of rotation of shaft 705 causes actuator 726 of governor 725 to move, and as a result, poles 711, 712 move also. The assembly is such that as the speed of rotation of shaft 705 increases, poles 711, 712 are caused to move closer together. Thus, the intensity of the magnetic field experienced by windings 714 increases, and the potential difference between wires 730, 731 increases. Consequently, under these conditions, a larger d.c. may be drawn from generator 710. This direct current is substantially the only load on windmill 7 and produces a braking effect which acts to prevent acceleration of the windmill's rotation beyond a certain speed. At low wind speeds, the magnetic field experienced by windings 714 is relatively small, since poles 711, 712 are under those conditions relatively far apart, and relatively little d.c. may be drawn from generator 710, placing only a small load on the windmill. As a result, the windmill tends to accelerate to, and remain operating at, a substantially constant rotation speed. In this way it is possible to operate the windmill at low wind speeds, down to as little as 0.5 m/s.

Figure 8C:
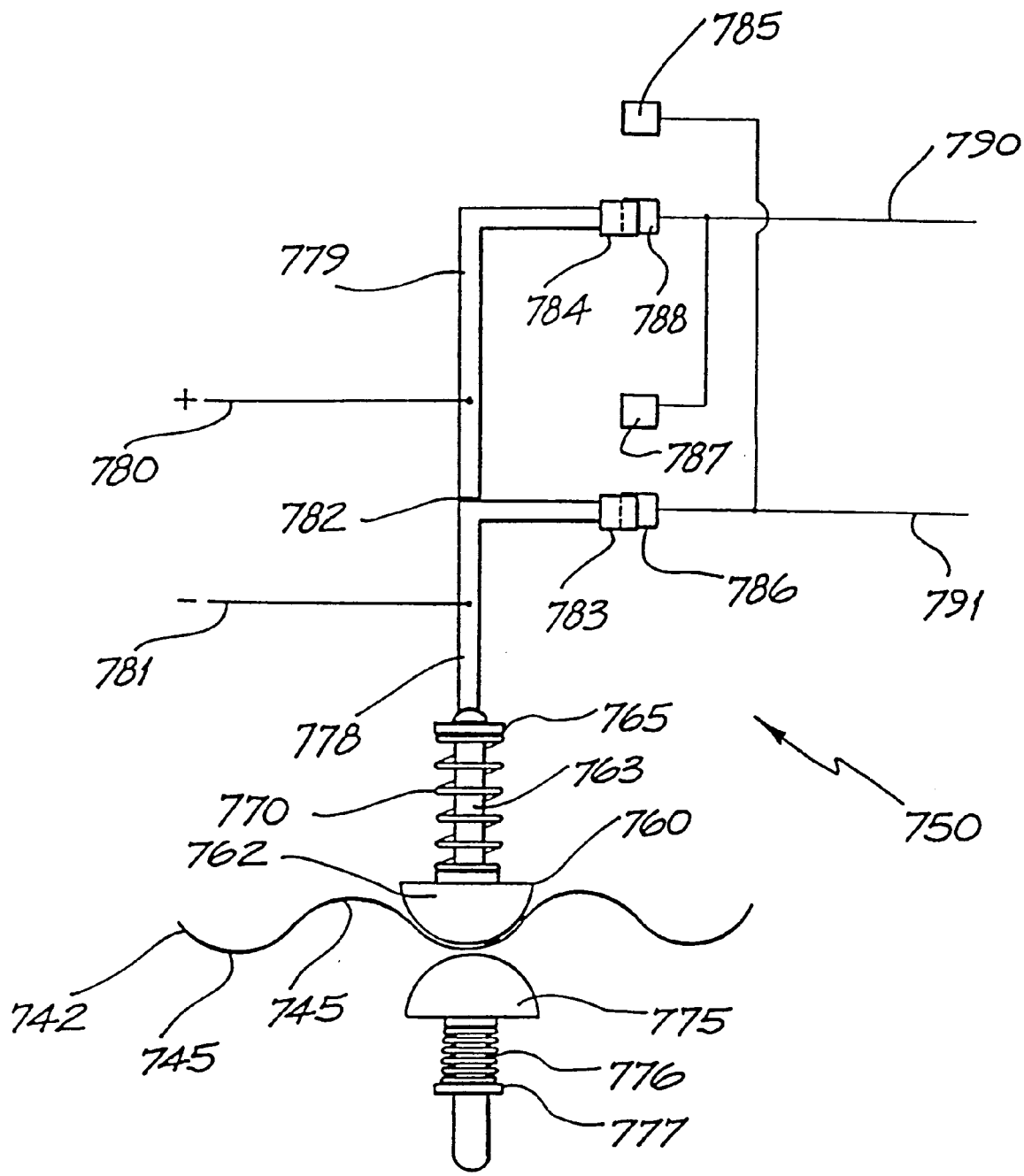
FIG. 8C is a diagrammatic representation of an a.c. converter assembly for use in the windmill shown in FIG. 8.

FIG. 8C provides a detailed schematic representation of a.c. converter assembly 750 shown in FIG. 8. Assembly 750 consists of two followers 760, 775 which are positioned in contact with the front and back faces of disc or ring 740, a portion of which is shown at 742, in the region of its periphery which is undulated. Follower 760 has a shaft 763 passing through collar 765 which is fixed to frame 708 of windmill 7. Shaft 763 carries spring 770 which abuts the head 762 of follower 760 at one end, and fixed collar 765 at the other. Similarly, follower 775 carries spring 776 which abuts fixed collar 777. The end of follower 760 remote from its head 762 is connected to rigid conductors 778, 779 which are separated by electrical insulator 782. Conductors 778, 779 terminate in d.c. contacts 783, 784 respectively and are electrically connected to flexible wires 781, 780 respectively. Wires 781, 780 are electrically connected to wires 730, 731 of windmill 7. D.c. contacts 783, 784 are positioned so as to make sliding contact with one or another of a pair of a.c. contacts. Thus d.c. contact 783 is positioned so as to make sliding contact with either a.c. contact 786 or 787, and d.c. contact 784 is positioned so as to make sliding contact with either a.c. contact 785 or 788. A.c. contacts 785–788 are electrically connected as shown in FIG. 8C.

When windmill 7 is operated, rotation of blades 700 causes disc or ring 740 to rotate. As a result, undulations 745 pass between followers 760, 775, causing followers 760, 775 to move backwards and forwards along their shafts under the action of springs 770, 776. The function of follower 775 is to maintain disc or ring 740 in contact with follower 760. The movement of follower 760 results in corresponding movement of conductor 778 and d.c. contact 783, which is thus alternately positioned in contact with a.c. contacts 786 and 787. Correspondingly, d.c. contact 784 is alternately positioned in contact with a.c. contacts 788 and 785 by virtue of the movement of conductor 779. Lead 790 is thus alternately positive and negative with respect to lead 791. The frequency of alternation depends on the speed of rotation of windmill 7 and the number of undulations 745 in disc or ring 740. In a typical arrangement, windmill 7 rotates at about 50 revolutions per minute, and disc or ring 740 has about 1000 undulations. The resulting a.c. frequency is thus approximately 800 Hz.

Figure 9A:
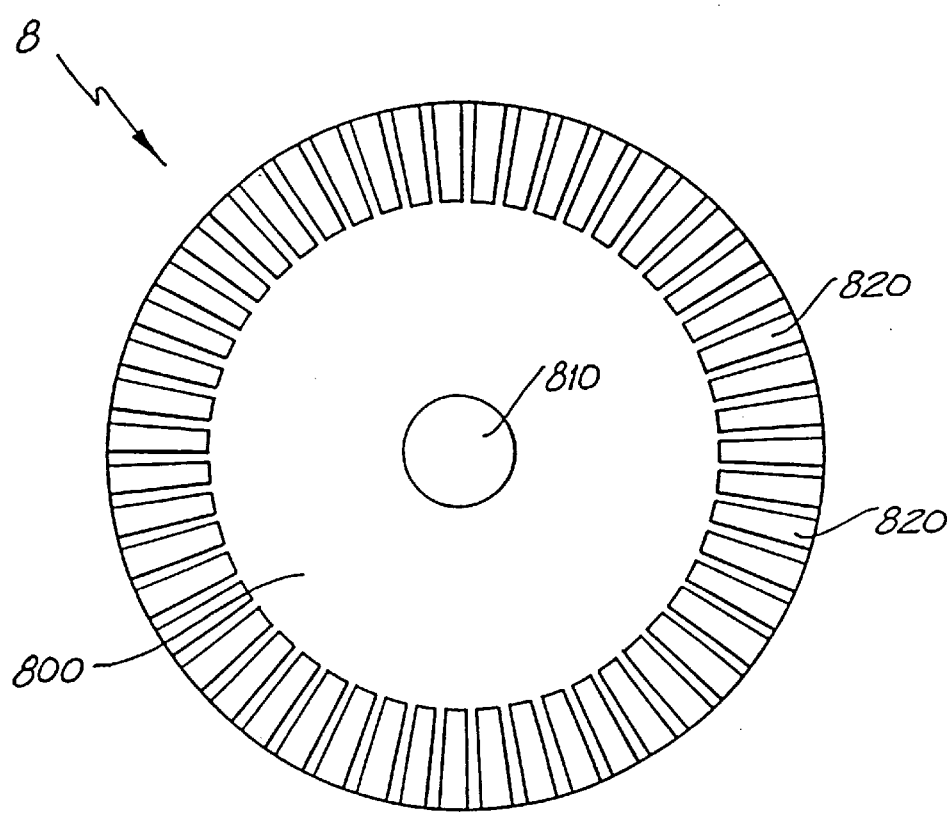
FIG. 9A and 9B are respectively a plan view and a side view of a magnetic field source suitable for use in the apparatus of the invention.
Figure 9B:
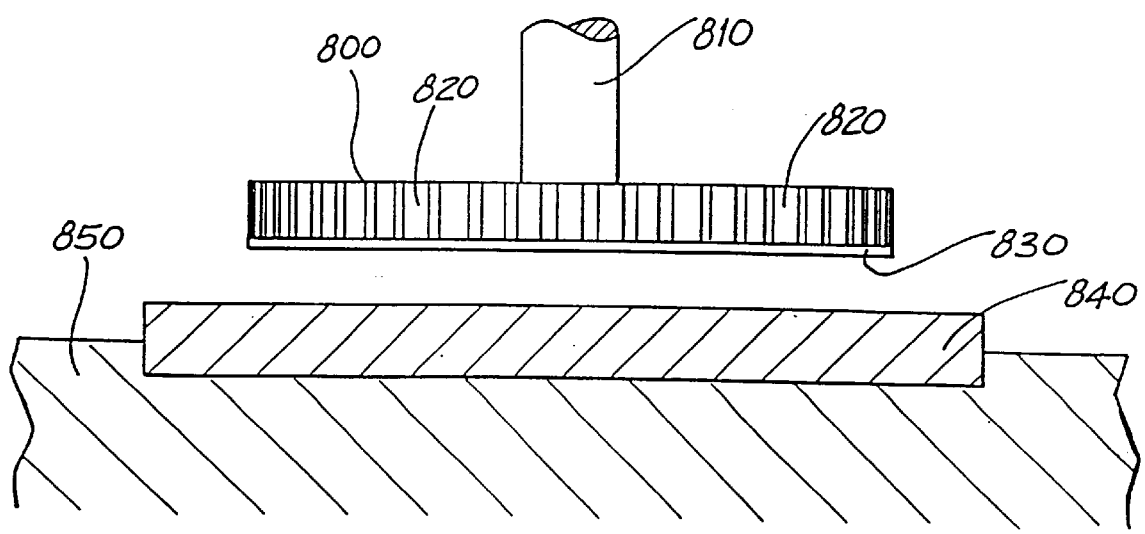

FIGS. 9A and 9B respectively show a plan view and side vie of a magnetic field source suitable for use in the apparatus of the invention. Magnetic field source 8 includes generally circular disk 800 having a centrally located shaft 810 connected to it and having mounted near its periphery 25 equally spaced permanent magnets 820 of rare earth alloy or niobium/iron. Disk 800 is positioned adjacent a face of essentially 100% fine grain crystalline graphite block 840 as seen in FIG. 9B, such that the magnetic fields of magnets 820 penetrate into block 840. Graphite block 840 is inlaid into a block 850 of approximately 95% graphite so that blocks 840 and 850 are in good thermal contact. The thickness of block 840 is greater than the depth of penetration of the magnetic field of magnets 820 into block 840, and is typically at least approximately 5 cm. Graphite block 850 is fixed so that it does not rotate when disk 800 is rotated. Disk 800 and graphite blocks 840, 850 may be surrounded by air, or more typically they are surrounded by an evacuated housing (not shown) such a illustrated in FIGS. 2 and 3.

Magnets 820 have a cross-sectional shape of an inverted "U" and are arranged so that north and south poles alternate around the circle made by the magnets, on the face of disk 800 closet to block 840, thereby creating 50 changes of magnetic field direction around the periphery of this face of disk 800. In an alternative arrangement (not shown) 50 magnets each in the shape of an inverted "U" may be arranged around the periphery of disk 800 so that in each magnet one pole lies radially inwardly of the other pole, the poles of each magnet being in the opposite orientation to those of neighbouring magnets. This arrangement also provides 50 changes of magnetic field direction around the periphery of disk 800. It will be appreciated that in this arrangement, the magnets are narrower than those shown in FIG. 9A.

The side of disk 800 closest to block 840 is faced with a layer of non-conducting, non-magnetic thermal insulation 830 such as Kaowool TBM2830 of sufficient thickness to prevent the magnetic material of which magnets 820 are made from exceeding its Curie temperature.

In use, shaft 810 is rotated by a suitable source of energy such as a windmill or water turbine and disk 800 holding magnets 820 is thereby rotated relative to blocks 840 and 850. The magnetic field of magnets 820 penetrates graphite block 840 and moves within block 840 as disk 800 moves. As a result, the magnetic field strength varies at any point within the part of block 840 which is penetrated by the magnetic field, this variation in magnetic field strength inducing electric eddy currents in block 840 which, owing to the electrical resistance of the graphite, heat block 840. Heat in block 840 is conducted to block 850.

The rotation speed of shaft 810 may be controlled by a suitable governor mechanism (not shown) for example including a mechanism to increase and decrease the space between insulating layer 830 and block 840 as previously described herein. Typically shaft 810 and disk 800 are adjusted to rotate at approximately 60 revolutions per minute.

This method heating block 850 has a number of advantages when the source of energy driving shaft 810 is wind or water movement, for example. In contrast to electrical inductive heating, there are no inductive heating coils, which require expensive equipment to provide the necessary large current flow and which require cooling, with resultant loss of useful energy. Inductive heating coils are also inherently less efficient, owing to losses due to eddy currents and heating which inevitably occur in the primary induction coil. In addition in the apparatus of the invention there is relatively little inertia or capacitance making it relatively easy to put it into motion on startup and making operation of the assembly at relatively low rotation speeds possible. For example, in a typical arrangement, a wind speed of as low as 0.5 m/s is sufficient to sustain rotation of the magnetic field source 8. Thus, useful energy may be extracted from a windmill, for example, even at quite low wind speeds. In addition magnetic field source 8 may be directly driven by a rotating device such as a windmill or water turbine without the need for complicated linkages, gears or other mechanisms which cause inefficiencies and energy losses.

If a magnetic field source such as shown in FIGS. 9A and 9B is used to heat a graphite block which include insulating spacers as shown in FIG. 4, the heated air from outlet 340 seen in FIG. 4 may be used to drive a small expansion engine which can provide some of the rotational energy required to drive shaft 810.

Figure 10:
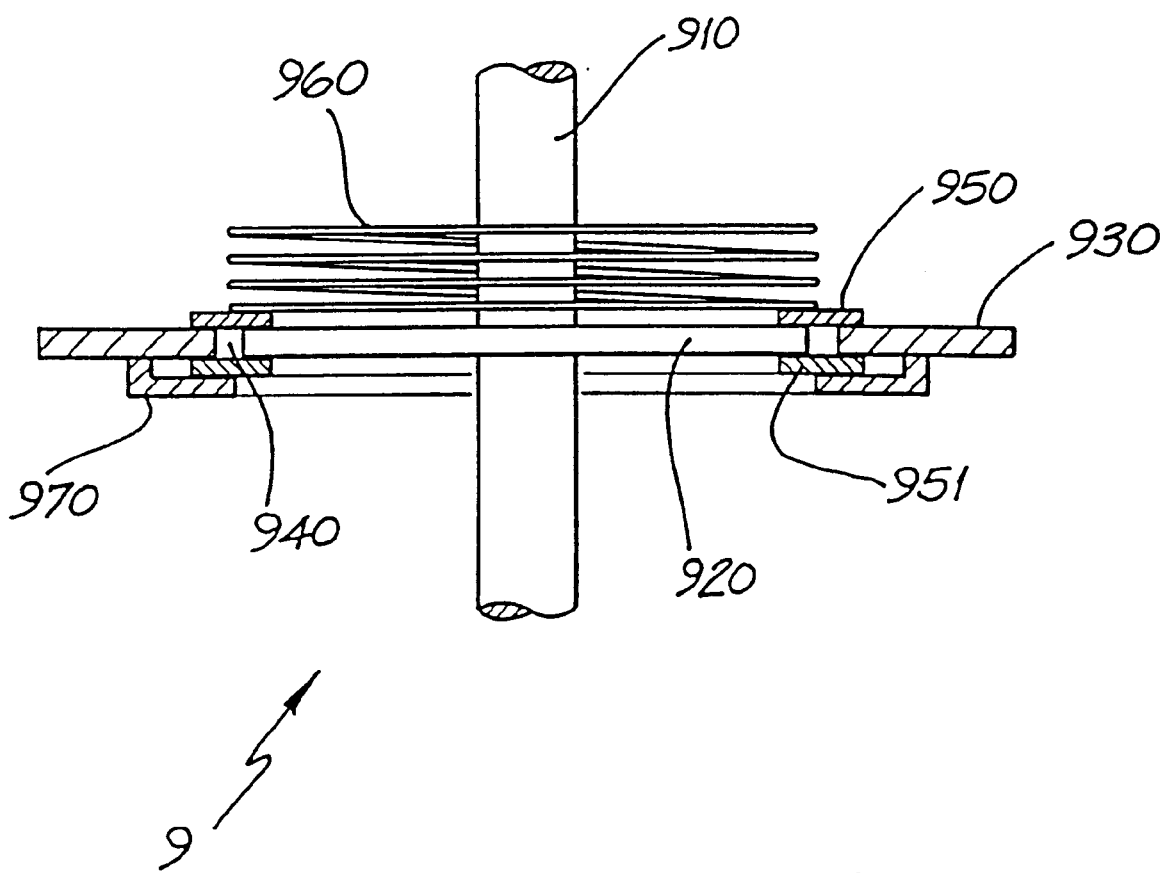
FIG. 10 is a schematic cross-section of a vacuum seal assembly suitable for sealing a housing having the shaft of a magnetic field source as shown in FIGS. 9A and 9B passing through it.

FIG. 10 shows a schematic cross-section of a vacuum seal assembly suitable for providing a vacuum seal on a housing such as housing 150 or 250 seen in FIGS. 2 or 3 respectively at a location where a shaft such as shaft 810 seen in FIGS. 9A and 9B passes through it. In FIG. 10, vacuum seal assembly 9 consists of shaft 910 carrying circular flange 920. A flat region of housing 930 has a circular hole rather larger in diameter than the diameter of flange 920. Flange 920 is positioned essentially in the plane of this flat region of housing 930, centrally within the circular hole. An annular space 940 is formed between the perimeter of flange 920 and the inner rim of the circular hole. Above and below space 940 are positioned two rings 950, 951 of graphite or teflon. The faces of rings 950, 951 which are in contact with flange 920 and housing 930 are ground or machined flat so as effectively to seal space 940 and prevent air outside housing 930 entering the evacuated region inside housing 930. On the outside of housing 930, ring 950 is held in place by pressure of spring 960 which abuts ring 950 at one end and abuts a suitable fixed flange or restraint (not shown) at its other end. On the inside of housing 930, ring 951 is fixed to housing 930 by means of circular clamp 970.

I claim:

1. An apparatus comprising a body of graphite and a magnetic field source operatively connected with said body of graphite so that a magnetic field of said magnetic field source penetrates at least a portion of a surface of said body of graphite, at least said portion of said surface comprising crystalline graphite, and so that at least one of said magnetic field source and said body of graphite is movable relative to the other for movement of said at least one of said magnetic field source and said body of graphite relative to the other to cause said magnetic field in said surface portion of said body of graphite to vary, whereby to induce eddy currents in said body of graphite and heat said body of graphite.

2. The apparatus of claim 1 further comprising heat insulation means operatively associated with said body of graphite to reduce heat losses therefrom.

3. The apparatus of claim 1 wherein said magnetic field source is movable relative to said body of graphite and said body of graphite is substantially fixed.

4. The apparatus of claim 1 further comprising a windmill or a turbine driven by flowing water, operatively associated with said magnetic field source to move said magnetic field source.

5. The apparatus of claim 4 wherein said magnetic field source comprises an assembly of a plurality of magnets which are positioned adjacent said portion of said surface of said body of graphite, said assembly being rotatable relative to said body of graphite.

6. The apparatus of claim 5 wherein said magnets are positioned proximate the circumference of a circular disk having a substantially centrally located rotatable shaft, a surface of said disk being opposable to said portion of said surface of said body of graphite, wherein when said shaft is rotated said magnets move relative to said body of graphite.

7. The apparatus of claim 6 wherein said magnets have the shape of an inverted "U" and wherein the poles of said magnets are positioned adjacent the surface of said disk opposable to said portion of said surface of said body of graphite.

8. The apparatus of claim 7 wherein the surface of said disk opposable to said region of the surface of said body of graphite is covered with a substantially non-conductive thermal insulator.

9. The apparatus of claim 8 wherein said thermal insulator is a ceramic insulator.

10. The apparatus of claim 5, further comprising means for adjusting a space between said assembly of a plurality of magnets and said surface of said body of graphite in response to a rotation speed of said assembly magnets.

11. The apparatus of claim 1 which is housed in an evacuated housing.

12. A method for heating a body of graphite comprising:
providing a body of graphite and a magnetic field source so that a magnetic field of said magnetic field source penetrates at least a portion of a surface of said body of graphite, at least said portion of said surface comprising crystalline graphite; and
moving at least one of said magnetic field source and said body of graphite relative to the other sufficiently to induce eddy currents in said body of graphite and thereby heat said body of graphite.

13. The method of claim 12 comprising moving said magnetic field source relative to said body of graphite.

14. The method of claim 12 comprising moving said magnetic field source by means of a windmill or a turbine driven by flowing water.

15. The method of claim 12 comprising positioning an assembly of a plurality of magnets adjacent a region of the surface of said body of graphite and rotating said assembly relative to said body of graphite.

16. The method of claim 15, further comprising adjusting a space between said assembly of a plurality of magnets and said surface of said body of graphite in response to speed of said rotating of said assembly of magnets.

* * * * *